US010921521B2

(12) United States Patent
Pei et al.

(10) Patent No.: US 10,921,521 B2
(45) Date of Patent: Feb. 16, 2021

(54) SPLICE CLOSURE AND METHOD FOR INSTALLING OPTICAL CABLE

(71) Applicant: Huawei Technologies Co., Ltd., Shenzhen (CN)

(72) Inventors: Guohua Pei, Wuhan (CN); Boyong He, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,461

(22) Filed: Mar. 29, 2019

(65) Prior Publication Data

US 2019/0227236 A1     Jul. 25, 2019

Related U.S. Application Data

(63) Continuation of application No. PCT/CN2016/101311, filed on Sep. 30, 2016.

(51) Int. Cl.
*G02B 6/255* (2006.01)
*G02B 6/44* (2006.01)
*H02G 15/013* (2006.01)
*H02G 15/115* (2006.01)

(52) U.S. Cl.
CPC ............ *G02B 6/2558* (2013.01); *G02B 6/44* (2013.01); *G02B 6/4442* (2013.01); *G02B 6/4444* (2013.01); *H02G 15/013* (2013.01); *H02G 15/115* (2013.01)

(58) Field of Classification Search
None
See application file for complete search history.

(56) References Cited

U.S. PATENT DOCUMENTS

2011/0211326 A1*   9/2011   Drouard ............... G02B 6/3827
                                                                                361/814

FOREIGN PATENT DOCUMENTS

| CN | 101271182 | * | 3/2007 | |
|---|---|---|---|---|
| CN | 101271182 A | | 9/2008 | |
| CN | 102165351 A | | 8/2011 | |
| CN | 102197557 A | | 9/2011 | |
| CN | 203881988 U | | 10/2014 | |
| EP | 2166389 A1 | * | 3/2010 | ............ H02G 3/083 |
| EP | 2166389 A1 | | 3/2010 | |
| WO | 2014101511 A1 | | 7/2014 | |

* cited by examiner

*Primary Examiner* — Chad H Smith
(74) *Attorney, Agent, or Firm* — Slater Matsil, LLP

(57) ABSTRACT

Embodiments provide a splice closure and a method for installing an optical cable. The splice closure includes a closure body, a cable accommodating tray, a nut component, an abutting member, and an elastic member. The abutting member is located between an optical cable and the nut component, and the elastic member is located between the optical cable and an installation tube. When the nut component is screwed to an externally threaded section of the installation tube by using threads of an internally threaded section, the abutting member abuts the elastic member, so that the elastic member elastically deforms under an abutting effect of the abutting member, so as to cause an inner circumferential wall of the elastic member that elastically deforms to abut the optical cable, and an outer circumferential wall of the elastic member that elastically deforms to abut an inner circumferential wall of the installation tube.

10 Claims, 17 Drawing Sheets

SPLICE CLOSURE AND METHOD FOR INSTALLING OPTICAL CABLE

CROSS-REFERENCE TO RELATED APPLICATIONS

This application is a continuation of International Patent Application No. PCT/CN2016/101311 filed on Sep. 30, 2016, the disclosure of which is hereby incorporated by reference in its entirety.

TECHNICAL FIELD

The present invention relates to communications equipment, and in particular, to a splice closure and a method for installing an optical cable.

BACKGROUND

Because of advantages such as large capacity, long distance, and anti-electromagnetic interference, optical fiber communication is eminently suitable for people's future requirements for a large amount of information and high precision. In addition, due to a low price, optical fibers can be widely used as a transmission medium. Currently, optical fiber networks are gradually used in homes. Namely, this is fiber to the home (FTTH). In an FTTH project, as an important access device connecting a user and a network, a splice closure for installing an optical cable is increasingly widely applied to FTTH technologies.

A description is provided below with reference to FIG. 1. FIG. 1 is a schematic diagram of a fiber to the home network in the current technology. As shown in FIG. 1, a central equipment room 101 converts an electrical signal into an optical signal, and transmits the signal obtained after conversion to a splice closure 102, and the splice closure sends the signal to a customer terminal box 104 by using a drop cable 103, so as to implement fiber to the home.

To seal the splice closure, after an optical cable is inserted in an installation hole of the splice closure, an adhesive heat shrink tubing is sleeved between the optical cable and the installation hole. A high-temperature heat gun is then used to blow the heat shrink tubing until the heat shrink tubing melts, so that the molten heat shrink tubing shrinks and tightly envelops the optical cable. In this way, no gap exists between the optical cable and the installation hole, thereby sealing the splice closure.

However, the manner of sealing a splice closure by melting a heat shrink tubing in a current technology has the following disadvantages. Special-purpose tools need to be used, for example, a heat gun and a power supply device that is used to supply power to the heat gun. However, during specific implementation, it is relatively difficult to find a power supply device that can supply power to the heat gun. In addition, approximately 20 minutes to 30 minutes are required to use the heat gun to process an installation hole in which one heat shrink tubing is installed, and multiple installation holes are provided on the splice closure. Consequently, sealing processing requires a relatively long time, and sealing efficiency is relatively low. In addition, once an installation hole is sealed, the installation hole cannot be repeatedly opened. To open the installation hole for maintenance, an optical cable can be cut out only from outside of the splice closure. This increases maintenance difficulty and costs, and increases wear of the optical cable.

SUMMARY

Embodiments of the present invention provide a splice closure and a method that improve installation efficiency and facilitate maintenance.

A first aspect of the embodiments of the present invention provides a splice closure.

The splice closure is responsible for providing a required service interface for a terminal user.

The splice closure is a passive device that reliably ensures connection of an optical fiber network, and a usage scenario of the splice closure is aerial, duct or buried.

The splice closure in the embodiments includes a closure body and a cable accommodating tray. An overall structure of the closure body in the embodiments is a cylindrical structure.

The cable accommodating tray is disposed inside the closure body, and the cable accommodating tray is used to accommodate an optical cable disposed inside the closure body. Specifically, an optical cable located inside the closure body is coiled on the cable accommodating tray.

A cable access hole is provided through an end face of the closure body, and the optical cable can enter and exit the splice closure through the cable access hole. An installation tube is connected to the cable access hole. An externally threaded section is annularly provided on an outer circumferential surface of the installation tube, an internally threaded section is annularly provided on an inner circumferential surface of a nut component, and the nut component is connected to the externally threaded section of the installation tube by using threads of the internally threaded section.

A hollow abutting member is inserted into the nut component, and a hollow elastic member is inserted into the installation tube. When the optical cable is sequentially threaded through the nut component, the installation tube, and the cable access hole to be installed in the cable accommodating tray, the abutting member is located between the optical cable and the nut component, and the elastic member is located between the optical cable and the installation tube. When the nut component is connected to the externally threaded section of the installation tube by using the threads of the internally threaded section, the abutting member abuts the elastic member.

When a user applies a screwing force to the nut component, a length of longitudinal space between the nut component and the installation tube is compressed, so that the abutting member abuts the elastic member, and exerts a pressure on the elastic member, and the elastic member elastically deforms under an abutting effect of the abutting member. Therefore, an inner circumferential wall of the elastic member that elastically deforms abuts the optical cable, and an outer circumferential wall of the elastic member that elastically deforms abuts an inner circumferential wall of the installation tube.

By means of the splice closure in the embodiments, even when the splice closure in the embodiments is applied to a harsh environment such as an underground environment, a protection level of IP68 can be reached. In a process of sealing the optical cable using the splice closure in the embodiments, a power supply and another device (for example, a heat gun in the current technology) are not needed, and the optical cable is sealed only mechanically. That is, after components are disposed around the optical cable, and the nut component is tightly screwed on the installation tube, the optical cable can be sealed. A sealing process is simple, operations are rapid, and efficiency of sealing the optical cable is effectively improved. In a subsequent process of maintaining the splice closure, the optical cable does not need to be cut, and the nut component only needs to be screwed off the installation tube to maintain the splice closure. It can be learned that, using the splice closure in the embodiments, an optical cable is repeatedly installed, an operation procedure of maintenance is simplified, maintenance costs are reduced, and maintenance efficiency is improved.

With reference to the first aspect of the embodiments of the present invention, in a first implementation of the first aspect of the embodiments of the present invention, an end face of the nut component with a hollow structure extends toward an axis of the nut component to form a holding portion, wherein the end face of the nut component is away from the closure body, where the holding portion is used to abut the abutting member inserted into the nut component; and the abutting member includes at least two sub-members.

A specific quantity of the sub-members is not limited in the embodiments, provided that the quantity of the sub-members included in the abutting member is greater than or equal to 2.

The at least two sub-members are joined to form the abutting member, one end of any one of the at least two sub-members abuts the holding portion, and the other end of the any one of the at least two sub-members abuts the elastic member.

The at least two sub-members are joined to form the abutting member. The sub-members may be formed by dividing the abutting member in an axial direction. That is, in the axial direction of the abutting member, lengths of the sub-members are equal to a length of the abutting member, and in a radial direction of the abutting member, lengths of the sub-members are less than a length of the abutting member.

In a specific process of disposing the abutting member around the optical cable, the optical cable may be placed in a groove of any one of the sub-members, the at least two sub-members are then joined to form the complete abutting member, and the abutting member is inserted into the nut component, so that all the sub-members located in the nut component are joined to form the complete abutting member. In this case, the abutting member is disposed around the optical cable.

By means of the splice closure in the embodiments, during installation of an excessively long optical cable, the abutting member does not need to be disposed from an end of the optical cable, but instead can be directly installed over the optical cable, thereby reducing operation difficulty in installing the abutting member, and improving installation efficiency of installing the abutting member.

With reference to the first aspect of the embodiments of the present invention or the first implementation of the first aspect of the embodiments of the present invention, in a second implementation of the first aspect of the embodiments of the present invention, the elastic member is in a hollow cylindrical structure, where a material of the elastic member is not limited in the embodiments, provided that the elastic member is an elastic part; for example, a material such as silica gel or rubber may be used for the elastic member; and a slot longitudinally extending along the elastic member is provided on a side of the elastic member, so that the optical cable can be inserted into the elastic member through the slot, and the elastic member can be disposed around the optical cable.

By means of the splice closure in the embodiments, during installation of an excessively long optical cable, the elastic member does not need to be disposed from an end of the optical cable, but instead can be directly installed over the optical cable, thereby reducing operation difficulty in installing the elastic member, and improving installation efficiency of installing the abutting member.

With reference to any one of the first aspect of the embodiments of the present invention to the second implementation of the first aspect of the embodiments of the present invention, in a third implementation of the first aspect of the embodiments of the present invention, the nut component in the embodiments is in a detachable structure, where the nut component includes a first sub-nut and a second sub-nut that are joined with each other, and internally threaded sections are provided on inner circumferential surfaces of the first sub-nut and the second sub-nut.

Specifically, an overall structure of the nut component in the embodiments is a hollow cylindrical structure. In this case, the first sub-nut and the second sub-nut joined to form the nut component are in semi-circular structures in cross-section in a radial direction of the nut component.

A first internally threaded section is provided on the inner circumferential surface of the first sub-nut, and a second internally threaded section is provided on the inner circumferential surface of the second sub-nut.

By means of the splice closure in the embodiments, during installation of an excessively long optical cable, the nut component does not need to be disposed from an end of the optical cable, but instead can be directly installed over the optical cable, thereby reducing operation difficulty in installing the elastic member, and improving installation efficiency of installing the abutting member.

With reference to the third implementation of the first aspect of the embodiments of the present invention, in a fourth implementation of the first aspect of the embodiments of the present invention, grooves are provided at target positions of the first sub-nut, where the target positions of the first sub-nut are end faces, facing the second sub-nut, of the first sub-nut, and the target positions of the first sub-nut are located at two ends of the first internally threaded section on the inner circumferential surface of the first sub-nut, that is, one groove is separately provided at two ends of the first internally threaded section of the first sub-nut that have a largest diameter; and guides are disposed at target positions of the second sub-nut, where the target positions of the second sub-nut are end faces, facing the first sub-nut, of the second sub-nut, and the target positions of the second sub-nut are located at two ends of the second internally threaded section on the inner circumferential surface of the second sub-nut, that is, one guide is separately provided at two ends of the second internally threaded section of the second sub-nut that have a largest diameter.

A manner of connecting the first sub-nut and the second sub-nut to form the complete nut component is described below.

The guides of the second sub-nut can be inserted into the grooves of the first sub-nut. During specific installation, when axes of the first sub-nut and the second sub-nut coincide, the guides of the second sub-nut relatively slide in guiding directions of the grooves of the first sub-nut. In this case, the first sub-nut and the second sub-nut are in a state of being fastened to each other. The guides continue to slide in the guiding directions of the grooves under an effect of an external force, until ends of the guides of the second sub-nut slide to bottoms of the grooves along the grooves of the first sub-nut. The first sub-nut and the second sub-nut are joined to form the complete nut component.

By means of the splice closure in the embodiments, during installation of an excessively long optical cable, the nut component does not need to be disposed from an end of the optical cable, but instead can be directly installed over the optical cable, thereby reducing operation difficulty in installing the elastic member, and improving installation efficiency of installing the abutting member.

With reference to the third implementation of the first aspect of the embodiments of the present invention or the fourth implementation of the first aspect of the embodiments of the present invention, in a fifth implementation of the first aspect of the embodiments of the present invention, at least one first through hole is provided through any position of an end of the first sub-nut; at least one second through hole is provided through an end of the second sub-nut; and any one of the at least one first through hole is a target first through hole, and a second through hole that is of the at least one second through hole and that is disposed coaxially with the target first through hole is a target second through hole, where an internally threaded section is provided on an inner circumferential surface of the target first through hole, where a screw sequentially passes through the target second through hole and the target first through hole, and an externally threaded section provided on the screw is connected to the internally threaded section of the target first through hole; or an internally threaded section is provided on an inner circumferential surface of the target second through hole, where a screw sequentially passes through the target first through hole and the target second through hole, and an externally threaded section provided on the screw is connected to the internally threaded section of the target second through hole.

By means of the nut component in the embodiments, structural stability of the complete nut component that is formed by fastening the first sub-nut to the second sub-nut to each other can be effectively ensured, and the first sub-nut and the second sub-nut are prevented from being separated from each other, thereby improving structural stability of the splice closure, and preventing the splice closure from being separated from the optical cable during subsequent use.

With reference to any one of the first aspect of the embodiments of the present invention to the fifth implementation of the first aspect of the embodiments of the present invention, in a sixth implementation of the first aspect of the embodiments of the present invention, the splice closure further includes at least two gaskets, and any one of the at least two gaskets is disposed on a target end face of the elastic member, where the target end face of the elastic member is an end face, facing the cable access hole, of the elastic member or an end face, facing the abutting member, of the elastic member; and the any one of the at least two gaskets abuts the target end face of the elastic member, or the any one of the at least two gaskets is fixedly disposed on the target end face of the elastic member.

By means of the splice closure in the embodiments, during installation of an excessively long optical cable, the gaskets do not need to be disposed from an end of the optical cable, but instead can be directly installed over the optical cable, thereby reducing operation difficulty in installing the gaskets, and improving installation efficiency of installing the abutting member.

With reference to any one of the first aspect of the embodiments of the present invention to the sixth implementation of the first aspect of the embodiments of the present invention, in a seventh implementation of the first aspect of the embodiments of the present invention, the cable access hole includes a first cable access hole, and the installation tube includes a first installation tube and a second installation tube, where the first cable access hole, the first installation tube, and the second installation tube are used to install a straight-through cable; the first cable access hole is in an elliptical structure, the first installation tube and the second installation tube are respectively disposed at two ends of a major axis of the first cable access hole, a first opening is provided on the first installation tube in an axial direction of the first installation tube, a second opening is provided on the second installation tube in an axial direction of the second installation tube, and the first opening and the second opening are disposed opposite each other in a direction of the major axis of the first cable access hole; and after the straight-through cable is folded, a bent portion, and a first connecting portion and a second connecting portion that are separately connected to the bent portion are formed, where the bent portion is inserted into the cable accommodating tray through the first opening, the second opening, and the first cable access hole, so that the first connecting portion is inserted into the first installation tube through the first opening, and the second connecting portion is inserted into the second installation tube through the second opening.

With reference to any one of the first aspect of the embodiments of the present invention to the seventh implementation of the first aspect of the embodiments of the present invention, in an eighth implementation of the first aspect of the embodiments of the present invention, the splice closure includes a first nut component and a second nut component that are used to install the straight-through cable, a thread of the first nut component is connected to the first installation tube to seal and install the first connecting portion, and a thread of the second nut component is connected to the second installation tube to seal and install the second connecting portion.

With reference to the sixth implementation of the first aspect of the embodiments of the present invention or the eighth implementation of the first aspect of the embodiments of the present invention, in a ninth implementation of the first aspect of the embodiments of the present invention, the splice closure further includes a wedge-shaped block, and an elastic layer is provided on an outer circumferential surface of a head of the wedge-shaped block; and the head of the wedge-shaped block is inserted into a mouth of the first cable access hole, so that the head of the wedge-shaped block abuts between a first elastic member and a second elastic member, where the first elastic member is an elastic member inserted into the first installation tube, and the second elastic member is an elastic member inserted into the second installation tube, so that the first elastic member that elastically deforms and the elastic layer abut against each other through the first opening, and the second elastic member that elastically deforms and the elastic layer abut against each other through the second opening.

A specific process of manufacturing the wedge-shaped block is not limited in this embodiment, provided that the manufactured wedge-shaped block can seal the first cable access hole. For example, a two-shot molding process may be used: first a rigid wedge-shaped block is produced by using a mold, and then over this rigid wedge-shaped framework, a thermoplastic soft-plastic material such as a Thermoplastic Elastomer (TPE) is injected over the framework by using an injection molding machine, to form the complete elastic layer.

To seal the straight-through cable, during assembly, first the wedge-shaped block is inserted into the first cable access hole, so that the wedge-shaped block can abut between the first opening and the second opening, and the wedge-shaped block can separately abut against the first elastic member and the second elastic member. In this way, a gap between the optical cable and the first cable access hole is desirably sealed by using the wedge-shaped block, and a sealing effect of the splice closure provided in the embodiments is improved.

With reference to any one of the first aspect of the embodiments of the present invention to the sixth implementation of the first aspect of the embodiments of the present invention, in a tenth implementation of the first aspect of the embodiments of the present invention, the cable access hole includes at least one second cable access hole, and the installation tube includes at least one third installation tube, where the at least one second cable access hole and the at least one third installation tube are used to install a branching cable; and an abutting portion is provided on an inner circumferential wall of a mouth of any one of the at least one second cable access hole, and an elastic fastener is provided on an outer circumferential wall of any one of the at least one third installation tube, so that when the elastic fastener is fastened to the abutting portion, the third installation tube is fixedly disposed on the second cable access hole.

A second aspect of the embodiments of the present invention provides a sealing method for sealing an optical cable, including: step A: sequentially threading an optical cable through a nut component, an abutting member, an elastic member, an installation tube, and a cable access hole to install the optical cable in a cable accommodating tray located inside a closure body, where the cable access hole is disposed through an end face of the closure body, and the installation tube is connected to the cable access hole; and step B: connecting an internally threaded section that is annularly provided on an inner circumferential surface of the nut component to an externally threaded section that is annularly provided on an outer circumferential surface of the installation tube.

In this way, the abutting member located between the nut component and the optical cable abuts the elastic member located between the installation tube and the optical cable, and the elastic member elastically deforms under an abutting effect of the abutting member, so as to cause an inner circumferential wall of the elastic member that elastically deforms to abut the optical cable, and an outer circumferential wall of the elastic member that elastically deforms to abut an inner circumferential wall of the installation tube.

For a specific structure of the splice closure on which the sealing method in the embodiments is based, refer to the first aspect of the embodiments of the present invention, and details are not described again in the embodiments of the present invention.

In a process of sealing the optical cable by using the sealing method in the embodiments, a power supply and another device (for example, a heat gun in the current technology) are not needed, and the optical cable is sealed only mechanically. That is, after components are disposed around the optical cable, and the nut component is tightly screwed on the installation tube, the optical cable can be sealed. A sealing process is simple, operations are rapid, and efficiency of sealing the optical cable is effectively improved. In a subsequent process of maintaining the splice closure, the optical cable does not need to be cut, and the nut component only needs to be screwed off the installation tube to maintain the splice closure. It can be learned that, by using the splice closure in the embodiments, an optical cable is repeatedly installed, an operation procedure of maintenance is simplified, maintenance costs are reduced, and maintenance efficiency is improved.

With reference to the second aspect of the embodiments of the present invention, in a first implementation of the second aspect of the embodiments of the present invention, the method further includes: step A further includes: step A0: disposing any one of at least two sub-members included in the abutting member around the optical cable, and inserting the any one of the at least two sub-members into the nut component.

In this way, the at least two sub-members are joined to form the abutting member, one end of the any one of the at least two sub-members abuts a holding portion of the nut component, and the other end of the any one of the at least two sub-members abuts the elastic member, wherein an end face of the nut component with a hollow structure extends toward an axis of the nut component to form the holding portion, wherein the end face of the nut component is away from the closure body.

By means of the sealing method in the embodiments, during installation of an excessively long optical cable, the abutting member does not need to be disposed from an end of the optical cable, but instead can be directly installed over the optical cable, thereby reducing operation difficulty in installing the abutting member, and improving installation efficiency of installing the abutting member.

With reference to the second aspect of the embodiments of the present invention or the first implementation of the second aspect of the embodiments of the present invention, in a second implementation of the second aspect of the embodiments of the present invention, the method further includes: step A further includes: step A1: inserting the optical cable into the elastic member through a slot of the elastic member.

The slot longitudinally extending along the elastic member is provided on a side of the elastic member.

By means of the sealing method in the embodiments, during installation of an excessively long optical cable, the elastic member does not need to be disposed from an end of the optical cable, but instead can be directly installed over the optical cable, thereby reducing operation difficulty in installing the elastic member, and improving installation efficiency of installing the abutting member.

With reference to any one of the second aspect of the embodiments of the present invention to the second implementation of the second aspect of the embodiments of the present invention, in a third implementation of the second aspect of the embodiments of the present invention, the nut component includes a first sub-nut and a second sub-nut that are joined with each other, and internally threaded sections are provided on inner circumferential surfaces of the first sub-nut and the second sub-nut, where step B includes: step B11: inserting the optical cable between the first sub-nut and the second sub-nut; and step B12: joining the first sub-nut and the second sub-nut to form the nut component, so that the nut component is disposed around the optical cable.

By means of the sealing method in the embodiments, during installation of an excessively long optical cable, the nut component does not need to be disposed from an end of the optical cable, but instead can be directly installed over the optical cable, thereby reducing operation difficulty in installing the elastic member, and improving installation efficiency of installing the abutting member.

With reference to the third implementation of the second aspect of the embodiments of the present invention, in a fourth implementation of the second aspect of the embodiments of the present invention, step B12 includes: step B121: inserting guides of the second sub-nut into grooves of the first sub-nut, where the grooves are provided at target positions of the first sub-nut, the target positions of the first sub-nut are end faces, facing the second sub-nut, of the first sub-nut, and the target positions of the first sub-nut are located at two ends of the internally threaded section on the inner circumferential surface of the first sub-nut; and the guides are disposed at target positions of the second sub-nut, the target positions of the second sub-nut are end faces, facing the first sub-nut, of the second sub-nut, and the target positions of the second sub-nut are located at two ends of the internally threaded section on the inner circumferential surface of the second sub-nut; and step B122: controlling the guides of the second sub-nut to relatively slide in guiding directions of the grooves of the first sub-nut, until ends of the guides of the second sub-nut slide to bottoms of the grooves along the grooves of the first sub-nut.

By means of the sealing method in the embodiments, during installation of an excessively long optical cable, the nut component does not need to be disposed from an end of the optical cable, but instead can be directly installed over the optical cable, thereby reducing operation difficulty in installing the elastic member, and improving installation efficiency of installing the abutting member.

With reference to the third implementation of the second aspect of the embodiments of the present invention or the fourth implementation of the second aspect of the embodiments of the present invention, in a fifth implementation of the second aspect of the embodiments of the present invention, step B further includes: step B31: providing at least one first through hole through any position of an end of the first sub-nut, and providing at least one second through hole through an end of the second sub-nut, where any one of the at least one first through hole is a target first through hole, and a second through hole that is of the at least one second through hole and that is disposed coaxially with the target first through hole is a target second through hole, where the joining the first sub-nut and the second sub-nut to form the nut component further includes: step B32: sequentially passing, by a screw, through the target second through hole and the target first through hole, so that an externally threaded section provided on the screw is connected to an internally threaded section of the target first through hole; or step B33: sequentially passing, by a screw, through the target first through hole and the target second through hole, so that an externally threaded section provided on the screw is connected to the internally threaded section of the target second through hole.

By means of the sealing method in the embodiments, structural stability of the complete nut component that is formed by fastening the first sub-nut to the second sub-nut to each other can be effectively ensured, and the first sub-nut and the second sub-nut are prevented from being separated from each other, thereby improving structural stability of the splice closure, and preventing the splice closure from being separated from the optical cable during subsequent use.

With reference to any one of the second aspect of the embodiments of the present invention to the fifth implementation of the second aspect of the embodiments of the present invention, in a sixth implementation of the second aspect of the embodiments of the present invention, the splice closure further includes at least two gaskets, and the method further includes: step C: disposing any one of the at least two gaskets on a target end face of the elastic member, where the target end face of the elastic member is an end face, facing the cable access hole, of the elastic member or an end face, facing the abutting member, of the elastic member, and the any one of the at least two gaskets abuts the target end face of the elastic member, or the any one of the at least two gaskets is fixedly disposed on the target end face of the elastic member.

With reference to any one of the second aspect of the embodiments of the present invention to the sixth implementation of the second aspect of the embodiments of the present invention, in a seventh implementation of the second aspect of the embodiments of the present invention, the cable access hole includes a first cable access hole, and the installation tube includes a first installation tube and a second installation tube, where the first cable access hole, the first installation tube, and the second installation tube are used to install a straight-through cable; and the first cable access hole is in an elliptical structure, the first installation tube and the second installation tube are respectively disposed at two ends of a major axis of the first cable access hole, a first opening is provided on the first installation tube in an axial direction of the first installation tube, a second opening is provided on the second installation tube in an axial direction of the second installation tube, and the first opening and the second opening are disposed opposite each other in a direction of the major axis of the first cable access hole, where step A includes: step A111: folding the straight-through cable to form a bent portion, and a first connecting portion and a second connecting portion that are separately connected to the bent portion; and step A112: inserting the bent portion into the cable accommodating tray through the first opening, the second opening, and the first cable access hole, so that the first connecting portion is inserted into the first installation tube through the first opening, and the second connecting portion is inserted into the second installation tube through the second opening.

With reference to the seventh implementation of the second aspect of the embodiments of the present invention, in an eighth implementation of the second aspect of the embodiments of the present invention, the connecting an internally threaded section that is annularly provided on an inner circumferential surface of the nut component to an externally threaded section that is annularly provided on an outer circumferential surface of the installation tube includes: connecting a thread of a first nut component that is used to install the straight-through cable to the first installation tube to seal and install the first connecting portion; and connecting a thread of a second nut component that is used to install the straight-through cable to the second installation tube to seal and install the second connecting portion.

With reference to the seventh implementation of the second aspect of the embodiments of the present invention or the eighth implementation of the second aspect of the embodiments of the present invention, in a ninth implementation of the second aspect of the embodiments of the present invention, the splice closure further includes a wedge-shaped block, and an elastic layer is provided on an outer circumferential surface of a head of the wedge-shaped block, where the method further includes: step D: inserting the head of the wedge-shaped block into a mouth of the first cable access hole, so that the head of the wedge-shaped block abuts between a first elastic member and a second elastic member, the first elastic member that elastically deforms and the elastic layer abut against each other through the first opening, and the second elastic member that elastically deforms and the elastic layer abut against each other through the second opening, where the first elastic member is an elastic member inserted into the first installation tube, and the second elastic member is an elastic member inserted into the second installation tube.

To seal the straight-through cable, during assembly, first the wedge-shaped block is inserted into the first cable access hole, so that the wedge-shaped block can abut between the first opening and the second opening, and the wedge-shaped block can separately abut against the first elastic member and the second elastic member. In this way, a gap between the optical cable and the first cable access hole is desirably sealed by using the wedge-shaped block, and a sealing effect of the splice closure provided in the embodiments is improved.

With reference to any one of the second aspect of the embodiments of the present invention to the sixth implementation of the second aspect of the embodiments of the present invention, in a tenth implementation of the second aspect of the embodiments of the present invention, the cable access hole includes at least one second cable access hole, and the installation tube includes at least one third installation tube, where the at least one second cable access hole and the at least one third installation tube are used to install a branching cable; and a holding portion is provided on an inner circumferential wall of a mouth of any one of the at least one second cable access hole, and an elastic fastener is provided on an outer circumferential wall of any one of the at least one third installation tube, where the method further includes: fastening the elastic fastener to the holding portion, so that the third installation tube is fixedly disposed on the second cable access hole.

Beneficial effects of using the splice closure and the sealing method provided in the embodiments of the present invention are as follows: In a process of sealing the optical cable by using the splice closure in the embodiments, a power supply and another device are not needed, and the optical cable is sealed only mechanically. That is, components are disposed around the optical cable, and the nut component is tightly screwed on an installation tube. After receiving a screwing force of a user, the nut component causes the abutting member to abut an elastic member, so that the elastic member elastically deforms under an abutting effect of the abutting member. Therefore, an inner circumferential wall of the elastic member that elastically deforms abuts the optical cable, and an outer circumferential wall of the elastic member that elastically deforms abuts an inner circumferential wall of the installation tube, thereby sealing the optical cable. A sealing process is simple, operations are rapid, and efficiency of sealing the optical cable is effectively improved. In a subsequent process of maintaining the splice closure, the optical cable does not need to be cut, and the nut component only needs to be screwed off the installation tube to maintain the splice closure. It can be learned that, by using the splice closure in the embodiments, an optical cable is repeatedly installed, an operation procedure of maintenance is simplified, maintenance costs are reduced, and maintenance efficiency is improved.

DETAILED DESCRIPTION OF ILLUSTRATIVE EMBODIMENTS

Figure 2:
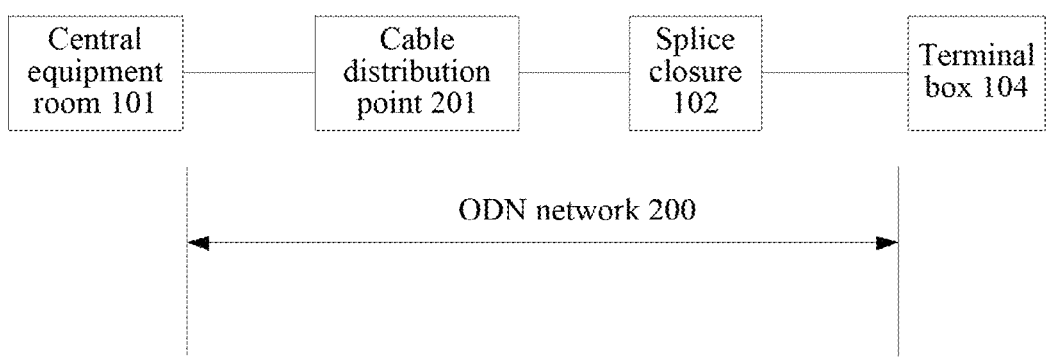
FIG. 2 is a schematic diagram of an embodiment of a basic structure of a fiber to the home network.

To better understand a splice closure provided in embodiments of the present invention, fiber access is first described below with reference to FIG. 2.

The splice closure in the embodiments should be applicable to a fiber access network (FTTX). The fiber access network may be specifically a fiber to the cabinet (FTTCab) network, a fiber to the curb (FTTC) network, a fiber to the building (FTTB) network, a fiber to the home (FTTH) network, or the like.

Figure 1:
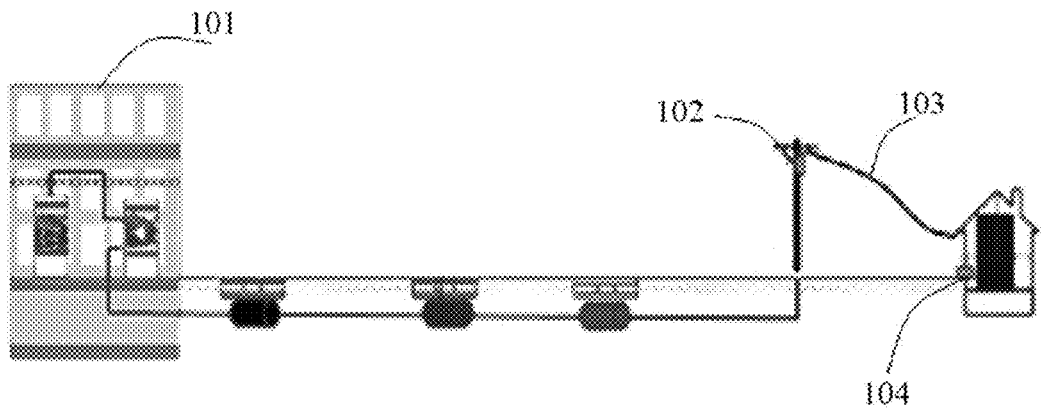
FIG. 1 is a schematic diagram of a fiber to the home network in a current system.

An FTTH network is used as an example. A basic structure of the fiber to the home cable network is described below with reference to FIG. 1 and FIG. 2.

The fiber to the home cable network includes a central equipment room 101, a cable distribution point 201, a splice closure 102, and a terminal box 104.

The central equipment room 101 is an optical line terminal (OLT).

The central equipment room 101 is used to provide an interconnection interface for a voice service network, a data service network, and a video service network, and implement main functions of network management.

An ODN network 200 is connected between the central equipment room 101 and the terminal box 104, and the ODN network 200 includes the cable distribution point 201 and the splice closure 102.

ODN is short for optical distribution network.

The ODN network 200 is responsible for connecting the central equipment room 101 and the terminal box 104 to which the ODN network 200 belongs. The ODN network 200 is used to provide an optical transmission means between the central equipment room 101 and the terminal box 104. A main function of the ODN network 200 is to complete distribution of optical signal power.

The terminal box 104 is an optical network unit (ONU) and/or an optical network terminal (ONT).

The terminal box 104 is responsible for providing a required service interface to a terminal user.

Specifically, the splice closure 102 is a passive device that reliably ensures connection of an optical fiber network, and a usage scenario of the splice closure 102 is aerial, duct or buried.

During cable routing inside the splice closure 102, a straight-through cable and a branching cable may be used.

Figure 3:
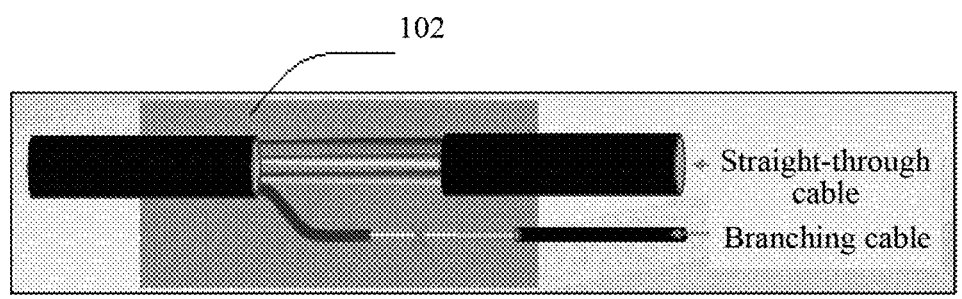
FIG. 3 is a schematic structural diagram of a principle of an embodiment of a straight-through cable and a branching cable during cable routing by using a splice closure.

As shown in FIG. 3, one optical cable enters the splice closure 102 and directly leaves the splice closure 102 without being cut or spliced. In this case, the optical cable is the straight-through cable.

As shown in FIG. 3, one optical cable enters the splice closure 102 and is divided into multiple cables that leave the splice closure 102. In this case, the optical cable is the branching cable.

Figure 4:
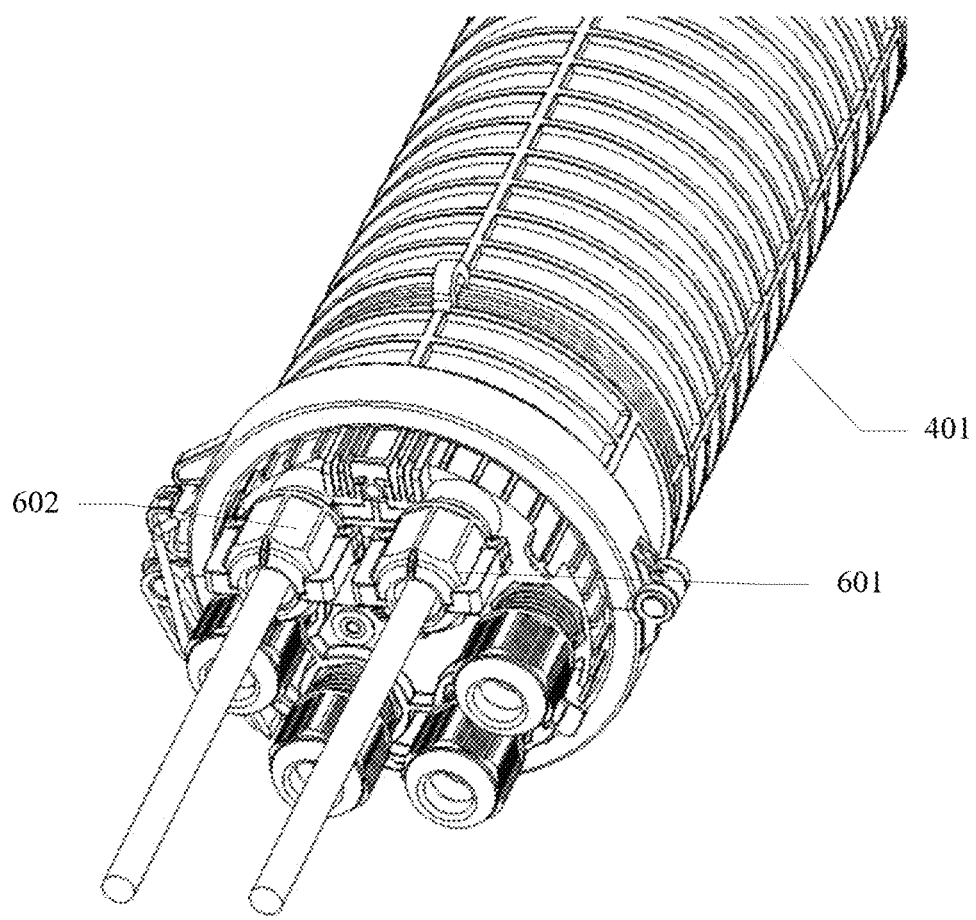
FIG. 4 is an overall schematic structural diagram of an embodiment of a splice closure according to the present invention.
Figure 5:
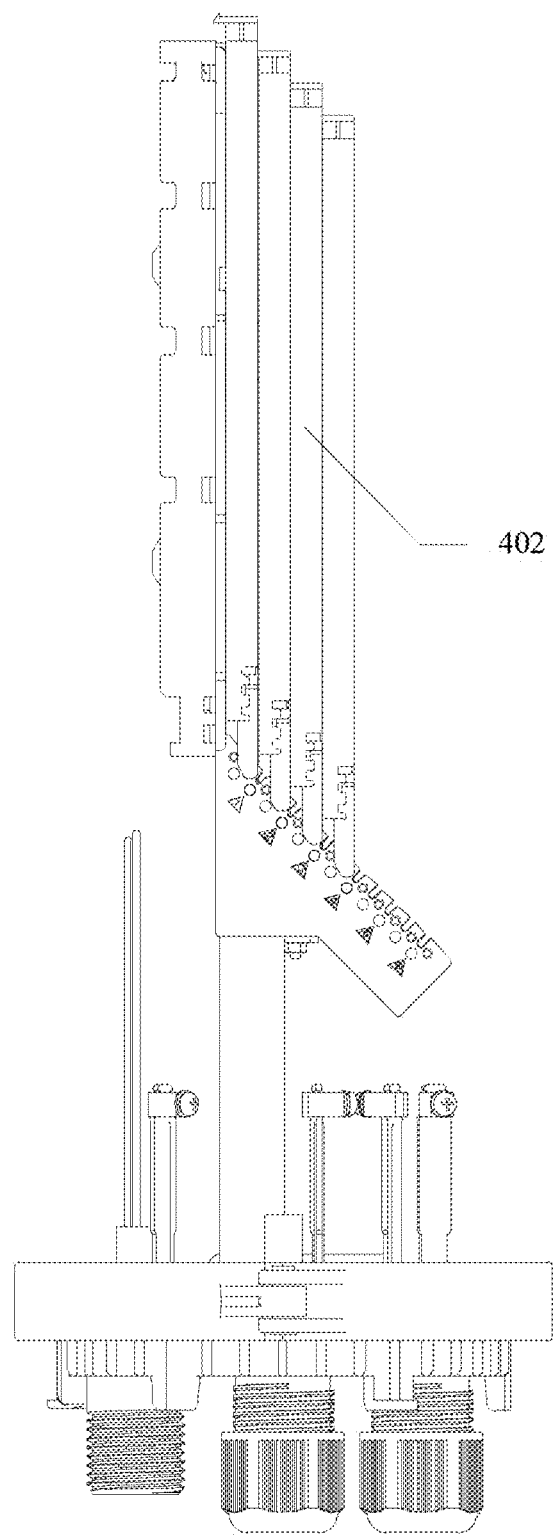
FIG. 5 is a partial schematic structural diagram of an embodiment of a splice closure according to the present invention.

Details of an overall structure of a splice closure in an embodiment are shown in FIG. 4 and FIG. 5. FIG. 4 is an overall schematic structural diagram of an embodiment of a splice closure according to the present invention. FIG. 5 is a partial schematic structural diagram of an embodiment of a splice closure according to the present invention.

The splice closure in this embodiment includes a closure body 401 and a cable accommodating tray 402.

An overall structure of the closure body 401 in this embodiment is a cylindrical structure. It should be noted that, a specific structure and an external shape of the closure body 401 are not limited in this embodiment.

The cable accommodating tray 402 is disposed inside the closure body 401, and the cable accommodating tray 402 is used to accommodate an optical cable disposed inside the closure body 401. Specifically, an optical cable located inside the closure body 401 is coiled on the cable accommodating tray 402.

A specific structure of the cable accommodating tray 402, a manner of fixedly disposing the cable accommodating tray 402 inside the closure body 401, and a specific quantity of the cable accommodating trays 402 are not limited in this embodiment, provided that the cable accommodating tray 402 can accommodate an optical cable located inside the closure body 401.

To ensure that the splice closure in this embodiment has a desirable sealing effect, the splice closure in this embodiment can seal the straight-through cable and the branching cable.

A manner of sealing the straight-through cable using the splice closure in this embodiment is described below with reference to the accompanying drawings.

Figure 6:
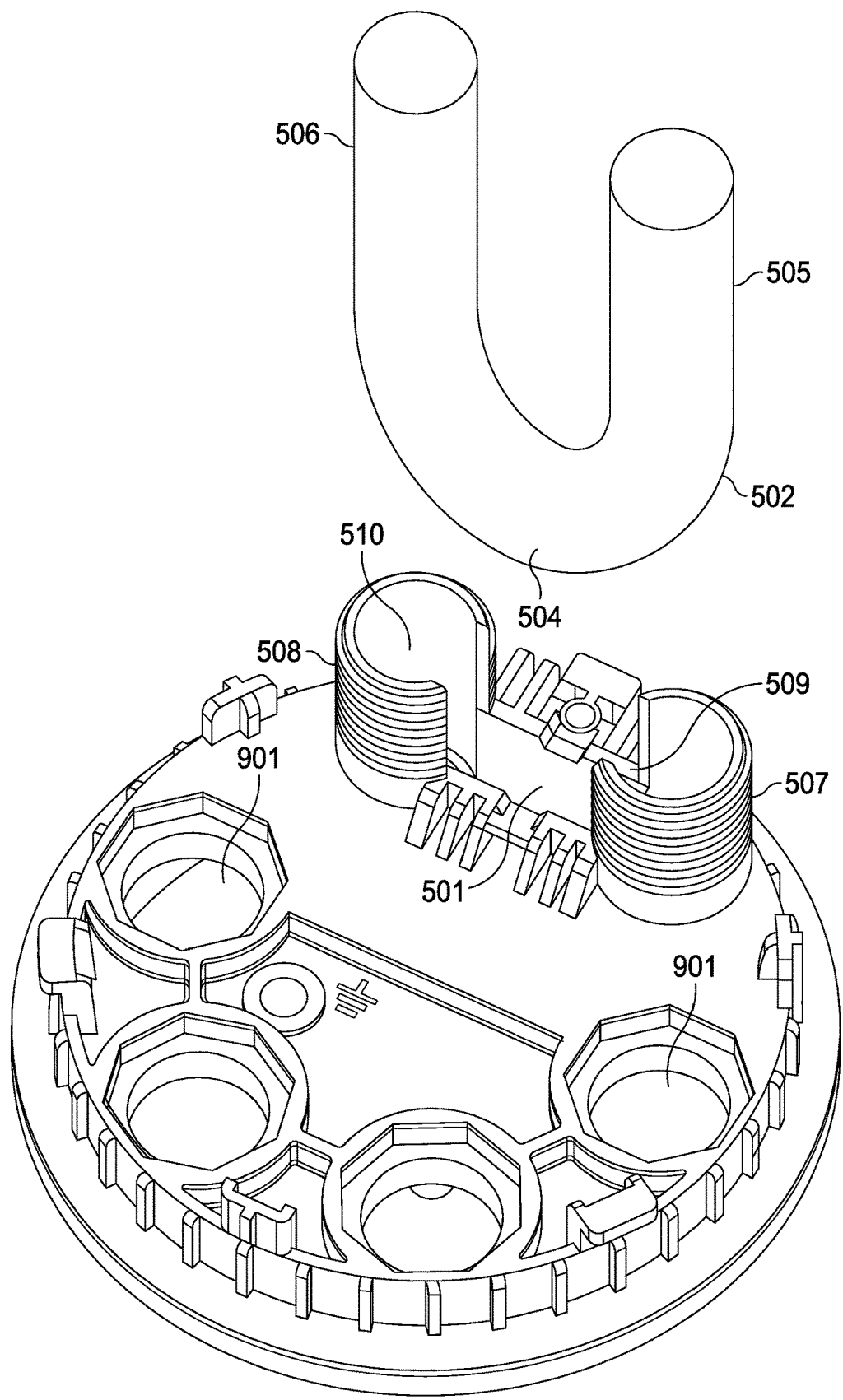
FIG. 6 is a schematic structural diagram of an embodiment of a base of a splice closure according to the present invention.
Figure 7:
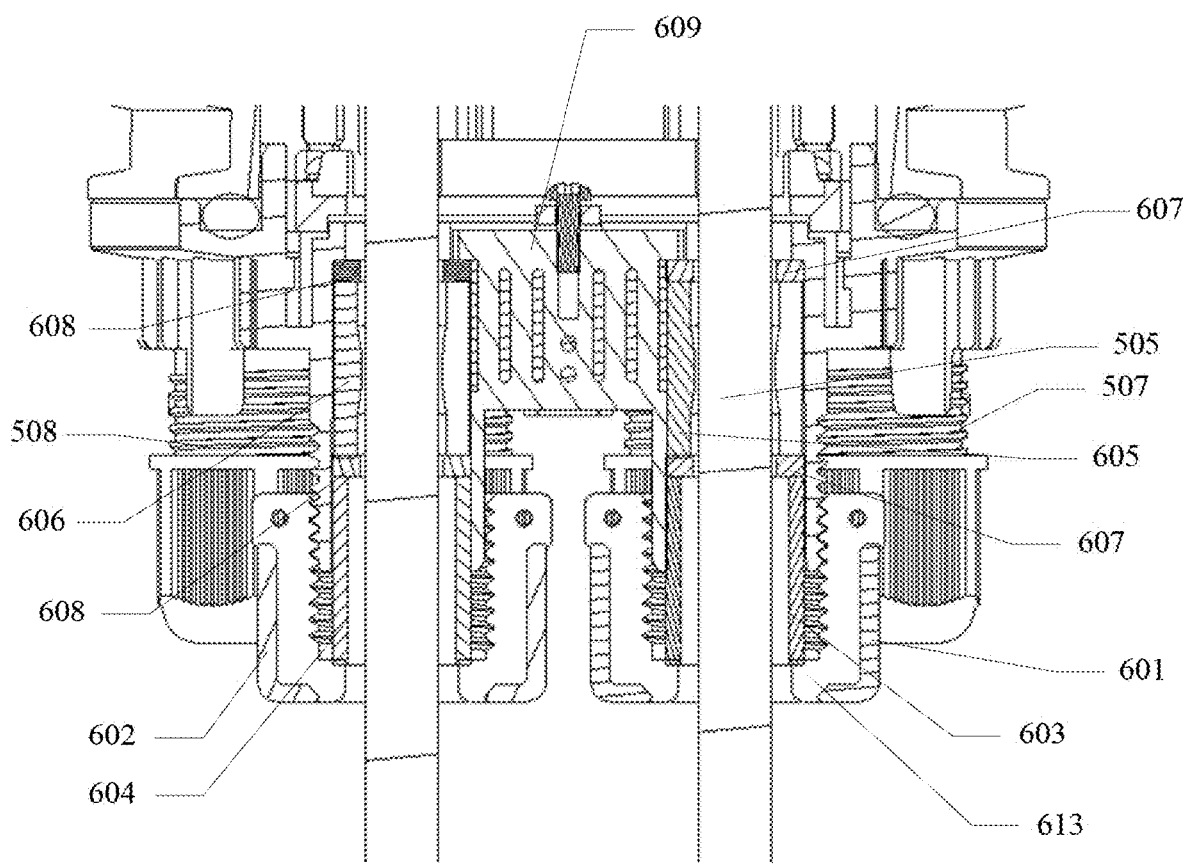
FIG. 7 is a partial schematic structural diagram of a cross section of an embodiment of a splice closure according to the present invention.
Figure 8:
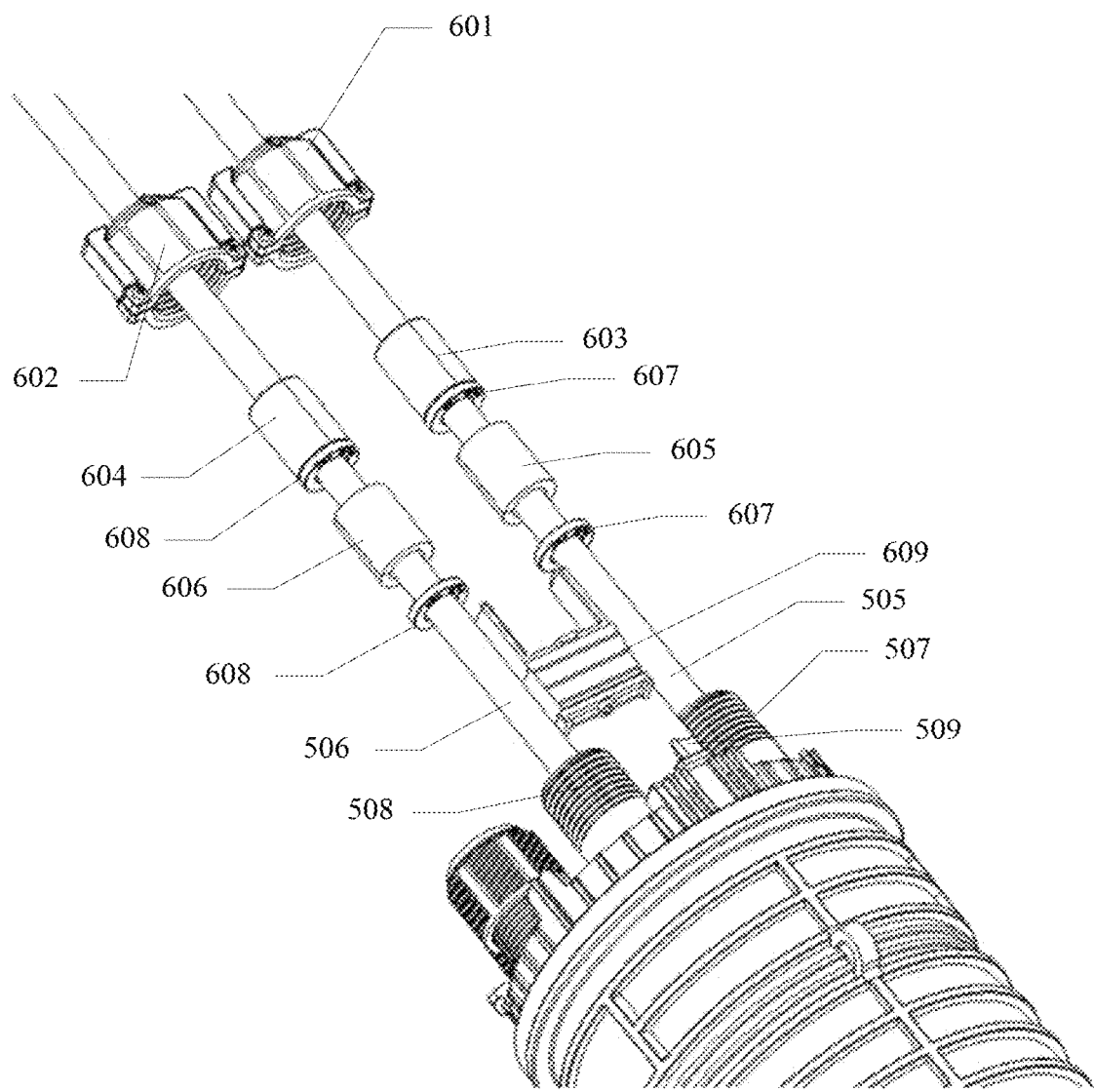
FIG. 8 is a schematic structural exploded diagram of a connection of an embodiment of a splice closure according to the present invention.

With reference to FIG. 4 to FIG. 8, FIG. 6 is a schematic structural diagram of an embodiment of a base of a splice closure according to the present invention. FIG. 7 is a partial schematic structural diagram of a cross section of an embodiment of a splice closure according to the present invention. FIG. 8 is a schematic structural exploded diagram of a connection of an embodiment of a splice closure according to the present invention.

A first cable access hole 501 is provided through an end face of the closure body 401.

The first cable access hole 501 in this embodiment is used to install the straight-through cable. Specifically, the straight-through cable can be inserted into the closure body 401 through the first cable access hole 501, and disposed on the cable accommodating tray 402.

Specifically, during specific installation, the straight-through cable that is not cut short needs to be inserted into the closure body 401 through the first cable access hole 501.

More specifically, the straight-through cable 502 needs to be folded, and a bent portion 504, a first connecting portion 505 connected to one end of the bent portion 504, and a second connecting portion 506 connected to the other end of the bent portion 504 are formed after the straight-through cable is folded.

During specific installation, to fold the straight-through cable 502 without breaking the straight-through cable 502, a maximum bending radius that is of the bent portion 504 and that is formed by using the straight-through cable 502 is greater than or equal to 30 millimeters.

Certainly, in this embodiment, a value of the maximum bending radius of the bent portion 504 is described as an optional example and is not limited.

To smoothly install the straight-through cable 502 by using the splice closure, the first cable access hole 501 is an elliptical hole, and an opening of the first cable access hole 501 has a size of at least approximately 70 millimeters, so that the first cable access hole 501 can securely ensure that the straight-through cable 502 is inserted into the closure body 401 of the splice closure.

When the bent portion 504 is inserted into the closure body 401 through the first cable access hole 501, and the bent portion 504 is disposed in the cable accommodating tray 402, the straight-through cable 502 is sealed by using the following structure.

The splice closure in this embodiment further includes a first installation tube 507 and a second installation tube 508.

In this embodiment, the first installation tube 507 and the second installation tube 508 are respectively disposed at two ends of a major axis of the first cable access hole 501.

A specific manner of fixedly disposing the first installation tube 507 and the second installation tube 508 at the two ends of the major axis of the first cable access hole 501 of the splice closure is not limited in this embodiment. For example, the first installation tube 507 and the second installation tube 508 are integrally molded with the two ends of the major axis of the first cable access hole 501. For another example, fasteners are provided on outer circumferential surfaces of the first installation tube 507 and the second installation tube 508, holding grooves are provided on inner circumferential surfaces of the two ends of the major axis of the first cable access hole 501, and the fasteners and the holding grooves are disposed opposite each other, so that the first installation tube 507 and the second installation tube 508 are fastened inside the holding grooves of the first cable access hole 501 by using the fasteners.

Structures of the first installation tube 507 and the second installation tube 508 are specifically described below.

A first opening 509 is provided on the first installation tube 507 in an axial direction of the first installation tube 507.

A second opening 510 is provided on the second installation tube 508 in an axial direction of the second installation tube 508.

The first opening 509 and the second opening 510 are disposed opposite each other in a direction of the major axis of the first cable access hole 501. It can be learned that, the first installation tube 507 is connected to the first cable access hole 501 through the first opening 509, and the second installation tube 508 is connected to the first cable access hole 501 through the second opening 510.

By means of the splice closure in this embodiment, during installation of the straight-through cable, the bent portion 504 of the straight-through cable may be inserted into the cable accommodating tray 402 through the first opening 509, the second opening 510, and the first cable access hole 501. In a process of inserting the bent portion 504 into the cable accommodating tray 402, the first connecting portion 505 connected to the bent portion 504 is inserted into the first installation tube 507 through the first opening 509, and the second connecting portion 506 connected to the bent portion 504 is inserted into the second installation tube 508 through the second opening 510.

A manner of sealing the straight-through cable installed in the splice closure is described below.

To seal the straight-through cable, a first nut component 601, a second nut component 602, a first abutting member 603, a second abutting member 604, a first elastic member 605, a second elastic member 606, two first gaskets 607, two second gaskets 608, and a wedge-shaped block 609 are further provided in the splice closure.

To seal the straight-through cable, during assembly, first the wedge-shaped block 609 is inserted into the first cable access hole 501, the wedge-shaped block 609 abuts between the first opening 509 and the second opening 510, then the first gasket 607, the first elastic member 605, the first gasket 607, the first abutting member 603, and the first nut component 601 are sequentially disposed around the first connecting portion 505 of the straight-through cable, and the second gasket 608, the second elastic member 606, the second gasket 608, the second abutting member 604, and the second nut component 602 are sequentially disposed around the second connecting portion 506 of the straight-through cable.

Specific structures of the foregoing components are described below.

First referring to FIG. 9 to FIG. 14, the specific structure of the first nut component 601 is described.

The first nut component 601 and the second nut component 602 in this embodiment are in a same structure. The structure of the first nut component 601 is used as an example for description in this embodiment. For a specific structure of the second nut component 602, refer to a description of the specific structure of the first nut component 601, and details are not described again in this embodiment.

The first nut component 601 includes a first sub-nut 701 and a second sub-nut 702 that are joined with each other, and internally threaded sections are provided on inner circumferential surfaces of the first sub-nut 701 and the second sub-nut 702.

Specifically, an overall structure of the first nut component 601 in this embodiment is a hollow cylindrical structure. In this case, the first sub-nut 701 and the second sub-nut 702 that are joined to form the first nut component 601 are in semi-circular structures in cross-section in a radial direction of the first nut component 601.

It should be noted that, an example in which the first nut component 601 includes two sub-nuts is used for description. In actual application, the first nut component 601 may alternatively be formed by joining multiple sub-nuts. That is, a specific quantity of the sub-nuts that are joined to form the first nut component 601 is not limited in this embodiment.

In this embodiment, a first internally threaded section 703 is provided on the inner circumferential surface of the first sub-nut 704 and a second internally threaded section 704 is provided on the inner circumferential surface of the second sub-nut 702.

More specifically, grooves 705 are provided at target positions of the first sub-nut 701.

The target positions of the first sub-nut 701 are end faces, facing the second sub-nut 702, of the first sub-nut 701, and the target positions of the first sub-nut 701 are located at two ends of the first internally threaded section 703 on the inner circumferential surface of the first sub-nut 701. That is, one groove 705 is separately provided at two ends of the first internally threaded section 703 of the first sub-nut 701 that have a largest diameter.

Guides 706 are disposed at target positions of the second sub-nut 702.

The target positions of the second sub-nut 702 are end faces, facing the first sub-nut 701, of the second sub-nut 702, and the target positions of the second sub-nut 702 are located at two ends of the second internally threaded section 704 on the inner circumferential surface of the second sub-nut 702. That is, one guide 706 is separately provided at two ends of the second internally threaded section 704 of the second sub-nut 702 that have a largest diameter.

During specific installation of the straight-through cable, because the straight-through cable is excessively long, in specific operations, the first nut component 601 cannot be disposed from an end of the straight-through cable. Therefore, the first nut component 601 in this embodiment has a detachable structure. When the straight-through cable needs to be installed, the first connecting portion 505 of the straight-through cable may be placed between the first sub-nut 701 and the second sub-nut 702, and the first sub-nut 701 and the second sub-nut 702 are then connected to form the complete first nut component 601, so that the first connecting portion 505 of the straight-through cable is inserted into the first nut component 601.

A manner of connecting the first sub-nut 701 and the second sub-nut 702 to form the complete first nut component 601 is described below.

Figure 9:
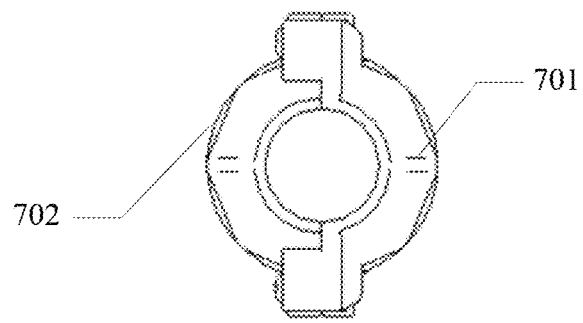
FIG. 9 is a schematic structural diagram of a top view of an embodiment of a first nut component according to the present invention.
Figure 10:
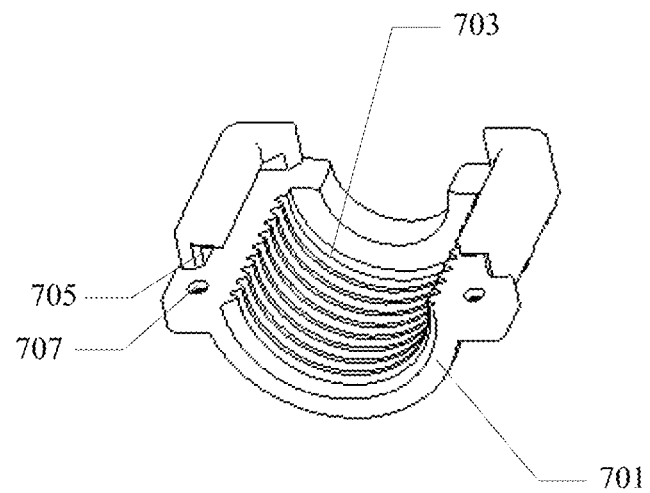
FIG. 10 is an overall schematic structural diagram of an embodiment of a first sub-nut included in a first nut component according to the present invention.
Figure 11:
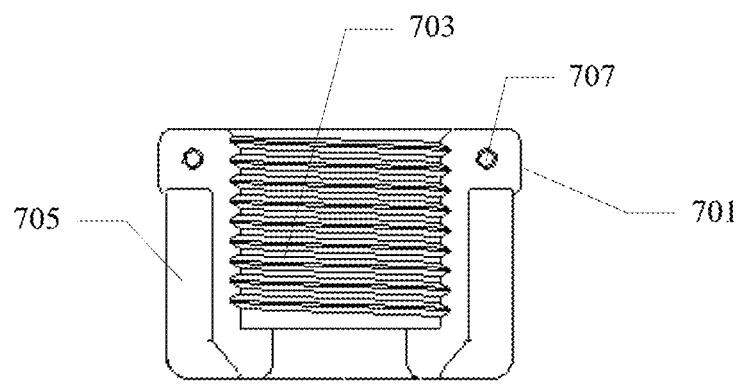
FIG. 11 is a schematic structural diagram of a top view of an embodiment of a first sub-nut included in a first nut component according to the present invention.
Figure 12:
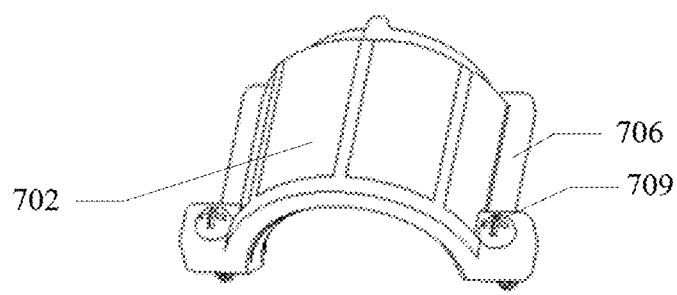
FIG. 12 is an overall schematic structural diagram of an embodiment of a second sub-nut included in a first nut component according to the present invention.
Figure 13:
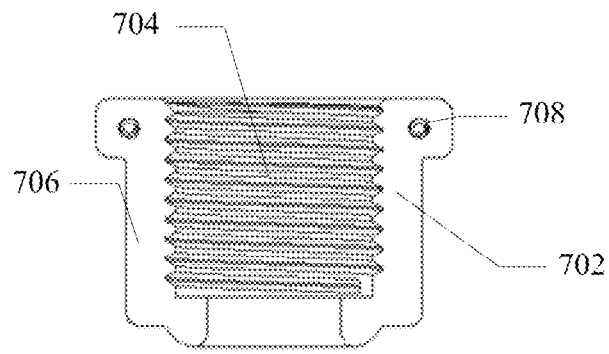
FIG. 13 is a schematic structural diagram of a top view of an embodiment of a second sub-nut included in a first nut component according to the present invention.
Figure 14:
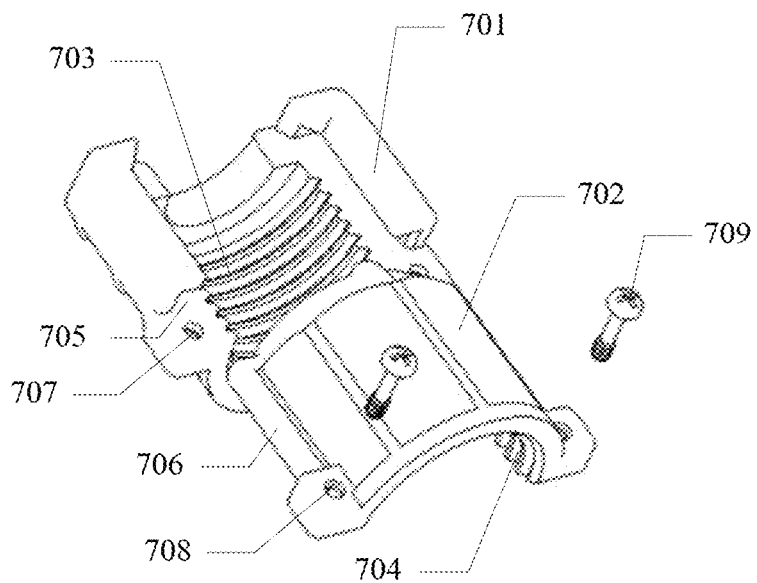
FIG. 14 is a schematic structural exploded diagram of a connection of an embodiment of a first nut component according to the present invention.

The guides 706 of the second sub-nut 702 can be inserted into the grooves 705 of the first sub-nut 701. During specific installation, when axes of the first sub-nut 701 and the second sub-nut 702 coincide, as shown in FIG. 14, the guides 706 of the second sub-nut 702 relatively slide in guiding directions of the grooves 705 of the first sub-nut 701. In this case, the first sub-nut 701 and the second sub-nut 702 are in a state of being fastened to each other. The guides 706 continue to slide in the guiding directions of the grooves 705 under an effect of an external force, until ends of the guides 706 of the second sub-nut 702 slide to bottoms of the grooves 705 along the grooves 705 of the first sub-nut 701. As shown in FIG. 9, the first sub-nut 701 and the second sub-nut 702 are joined to form the complete first nut component 601.

To ensure structural stability of the complete first nut component 601 formed by fastening the first sub-nut 701 and the second sub-nut 702 with each other, and prevent the first sub-nut 701 and the second sub-nut 702 from being separated from each other, at least one first through hole 707 is provided through any position of an end of the first sub-nut 701.

At least one second through hole 708 is provided through an end of the second sub-nut 702.

An example in which there are two first through holes 707 and two second through holes 708 is used for description in this embodiment. It should be noted that, specific quantities of the first through holes 707 and the second through holes 708 are not limited in this embodiment, provided that the quantity of the first through holes 707 is equal to the quantity of the second through holes 708, and when the first sub-nut 701 and the second sub-nut 702 are fastened to each other to form the complete first nut component 601, the first through hole 707 and the second through hole 708 are coaxially disposed.

Specifically, the splice closure in this embodiment further includes a screw 709.

A quantity of the screws 709 in this embodiment is equal to the quantity of the first through holes 707. Specifically, an example in which there are two screws 709 is used for description in this embodiment.

In this embodiment, the first sub-nut 701 and the second sub-nut 702 are fastened by using the screws 709 in two manners.

In one manner, internally threaded sections are provided on inner circumferential surfaces of the first through holes 707, where the screws 709 sequentially pass through the second through holes 708 and the first through holes 707, and externally threaded sections provided on the screws 709 are connected to the internally threaded sections of the first through holes 707.

Optionally, the internally threaded sections may be directly disposed on the first through holes 707, or nuts may be embedded in the first through holes 707, so that the externally threaded sections provided on the screws 709 are connected to internally threaded sections of the nuts embedded in the first through holes 707.

For this disposing manner, whether internally threaded sections are provided on inner circumferential surfaces of the second through holes 708 is not limited.

In another manner, internally threaded sections are provided on inner circumferential surfaces of the second through holes 708, where the screws 709 pass through the first through holes 707 and the second through holes 708 sequentially, and externally threaded sections provided on the screws 709 are connected to the internally threaded sections of the second through holes 708.

Optionally, the internally threaded sections may be directly disposed on the second through holes 708, or nuts may be embedded in the second through holes 708, so that the externally threaded sections provided on the screws 709 are connected to internally threaded sections of the nuts embedded in the second through holes 708.

For this disposing manner, whether internally threaded sections are provided on inner circumferential surfaces of the first through holes 707 is not limited.

It should be noted that, an example in which the grooves 705 are disposed on the first sub-nut 701 and the guides 706 are disposed on the second sub-nut 702 is used for description. In actual application, guides may alternatively be disposed on the first sub-nut 701, and grooves may be disposed on the second sub-nut 702. This is not specifically limited in this embodiment.

By means of the specific structure of the first nut component 601 in this embodiment, the structure of the first nut component 601 is stable, and relative sliding between the first sub-nut 701 and the second sub-nut 702 that are combined to form the first nut component 601 is avoided. Therefore, the assembled first nut component 601 has fairly high strength and rigidity, and meets a torsion requirement during installation of the straight-through cable by using the splice closure.

It should further be noted that, the manner of joining the first sub-nut 701 and the second sub-nut 702 to form the complete first nut component 601 is described as an optional example, provided that the first nut component 601 formed by joining the first sub-nut 701 and the second sub-nut 702 can be disposed around the optical cable. For example, the first sub-nut 701 and the second sub-nut 702 may form the complete first nut component 601 in a manner of tightening by using a hose clamp.

During specific installation of the straight-through cable, because the straight-through cable is excessively long, in specific operations, the first elastic member 605 and the second elastic member 606 cannot be disposed from an end of the straight-through cable. Therefore, a manner of disposing the first elastic member 605 in this embodiment around the first connecting portion 505 of the straight-through cable is described below.

Figure 15:
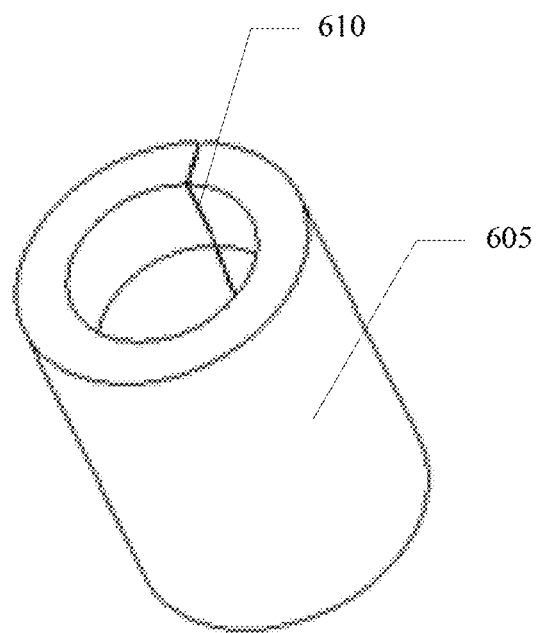
FIG. 15 is an overall schematic structural diagram of an embodiment of a first elastic member according to the present invention.

As shown in FIG. 15, FIG. 15 is an overall schematic structural diagram of an embodiment of a first elastic member according to the present invention.

For a specific structure of the second elastic member 606 in this embodiment, refer to a description of a structure of the first elastic member 605 in this embodiment, and details are not described again in this embodiment.

The first elastic member 605 in this embodiment is in a hollow cylindrical structure. A material of the first elastic member 605 is not limited in this embodiment, provided that the first elastic member 605 is an elastic part. For example, a material such as silica gel or rubber may be used for the first elastic member 605.

A slot 610 longitudinally extending along the first elastic member 605 is provided on a side of the first elastic member

605, so that the first connecting portion 505 of the straight-through cable can be inserted into the first elastic member 605 through the slot 610, and therefore the first elastic member 605 can be disposed around the first connecting portion 505.

For a specific manner of disposing the second elastic member 606 around the second connecting portion 506, refer to the specific process of disposing the first elastic member 605 around the first connecting portion 505, and details are not described again in this embodiment.

It should be noted that, in this embodiment, the structure of the first elastic member 605 is described as an optional example, and is not limited, provided that the first elastic member 605 can be directly disposed around the first connecting portion 505.

During specific installation of the straight-through cable, because the straight-through cable is excessively long, in specific operations, the first abutting member 603 and the second abutting member 604 cannot be disposed from an end of the straight-through cable. Therefore, a manner of disposing the first abutting member 603 in this embodiment around the first connecting portion 505 of the straight-through cable is described below.

Figure 16:
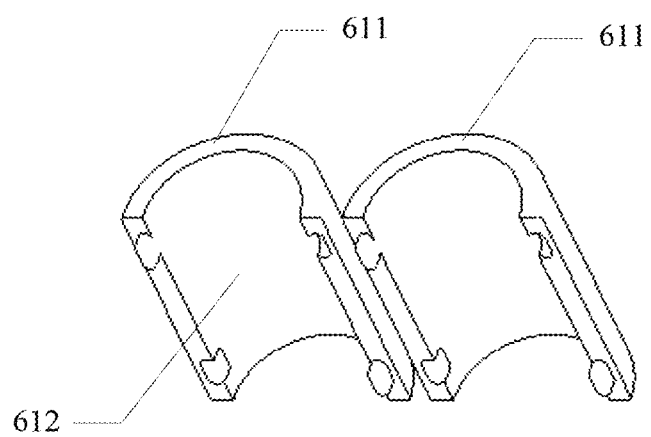
FIG. 16 is a schematic structural exploded diagram of an embodiment of a first abutting member according to the present invention.

As shown in FIG. 16, FIG. 16 is a schematic structural exploded diagram of an embodiment of a first abutting member according to the present invention.

It should be noted that, a specific structure of the second abutting member 604 in this embodiment is the same as a structure of the first abutting member 603. For the specific structure of the second abutting member 604, refer to the specific structure of the first abutting member 603, and details are not described again in this embodiment.

The first abutting member 603 includes at least two sub-members 611.

A specific quantity of the sub-members 611 is not limited in this embodiment, provided that the quantity of the sub-members 611 included in the first abutting member 603 is greater than or equal to 2.

An example in which there are two sub-members 611 is used for description in this embodiment.

The two sub-members 611 are joined to form the first abutting member 603. It can be seen from FIG. 16 that the sub-members 611 may be formed by dividing the first abutting member 603 in an axial direction. That is, in the axial direction of the first abutting member 603, lengths of the sub-members 611 are equal to a length of the first abutting member 603, and in a radial direction of the first abutting member 603, lengths of the sub-members 611 are less than a length of the first abutting member 603.

In a specific process of disposing the first abutting member 603 around the first connecting portion 505, the first connecting portion 505 may be placed in a groove 612 of either sub-member 611, the two sub-members 611 are then joined to form the complete first abutting member 603, and the first abutting member 603 is inserted into the first nut component 601, so that both the sub-members 611 located in the first nut component 601 are joined to form the complete first abutting member 603. In this case, the first abutting member 603 is disposed around the first connecting portion 505, and the first abutting member 603 is located between the first connecting portion 505 and the first nut component 601.

The structure of the first abutting member 603 is described as an example in this embodiment, provided that the first abutting member 603 can be disposed between the first connecting portion 505 and the first nut component 601. For example, a slot may be provided on a side of the first abutting member 603 with a hollow cylindrical structure, and the slot of the first abutting member 603 may be disposed in the axial direction of the first abutting member 603, so that the first connecting portion 505 can be inserted into the first abutting member 603 through the slot of the first abutting member 603.

The first nut component 601 in this embodiment can securely fix the first abutting member 603 inside the first nut component 601. Specifically, as shown in FIG. 7, an end face of the first nut component 601 extends toward an axis of the first nut component 601 to form a holding portion 613, wherein the end face of the first nut component 601 is away from the closure body 401.

The holding portion 613 is used to abut the first abutting member 603 inserted into the first nut component 601. Due to an abutting effect of the holding portion 613, the first abutting member 603 is securely inserted into the first nut component 601, and the first nut component 601 can exert, on the first abutting member 603, a force toward the closure body 401 by using the holding portion 613.

In this embodiment, for a specific process of specifically disposing the second abutting member 604 around the second connecting portion 506, refer to the specific process of disposing the first abutting member 603 around the first connecting portion 505, and details are not described again in this embodiment.

During specific installation of the straight-through cable, because the straight-through cable is excessively long, in specific operations, the first gasket 607 and the second gasket 608 cannot be disposed from an end of the straight-through cable. Therefore, a specific structure of the first gasket 607 and a manner of disposing the first gasket 607 around the first connecting portion 505 are described below with reference to FIG. 17, FIG. 26, and FIG. 27.

Figure 17:
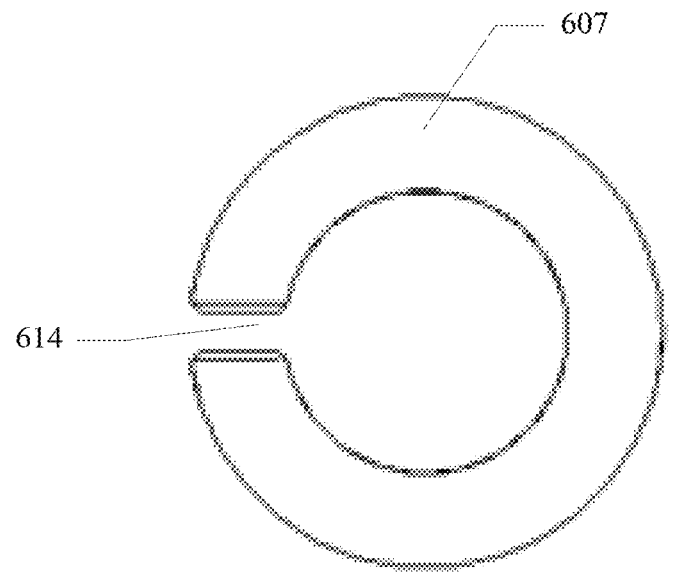
FIG. 17 is a schematic structural diagram of a top view of an embodiment of a first gasket according to the present invention.
Figure 26:
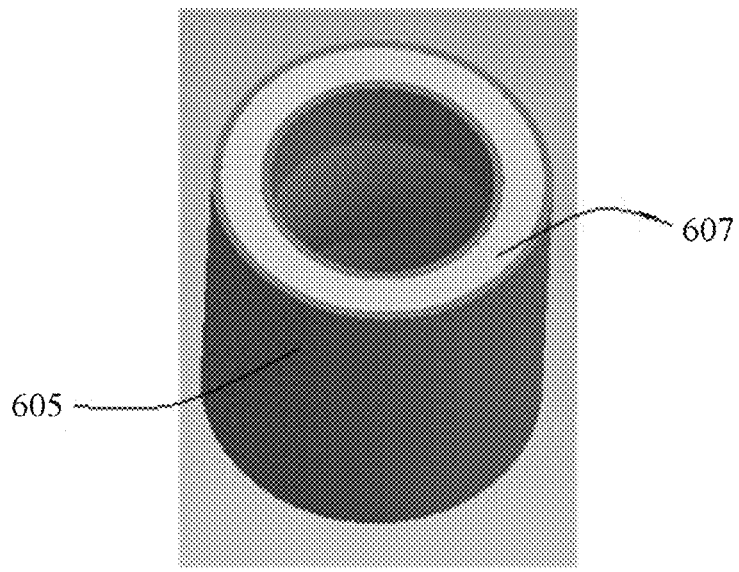
FIG. 26 is a schematic structural diagram of an embodiment in which a first gasket is disposed on an end face of a first elastic member according to the present invention.

Optionally, as shown in FIG. 17 and FIG. 26, the first gasket 607 is in an annular structure, and an opening 614 is provided through any end of the first gasket 607, so that the optical cable can be inserted into the first gasket 607 through the opening 614.

Figure 27:
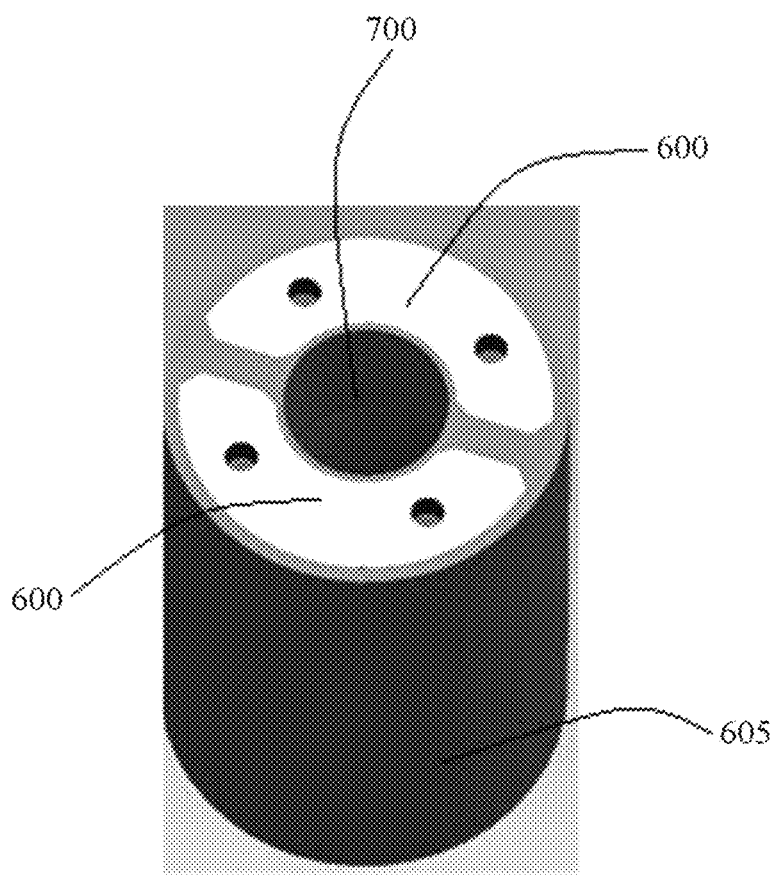
FIG. 27 is a schematic structural diagram of another embodiment in which a first gasket is disposed on an end face of a first elastic member according to the present invention.

Further optionally, as shown in FIG. 27, the first gasket 607 includes multiple gasket sub-members 600. Inner circumferential surfaces of the gasket sub-members 600 are in arc-shaped structures. All the gasket sub-members 600 can be joined to form the first gasket 607. That is, an area of the gasket sub-members 600 is less than an area of the first gaskets 607.

The inner circumferential surfaces that are of all the gasket sub-members 600 and that are in the arc-shaped structures are disposed opposite each other to form accommodating space 700, so that the optical cable can be inserted into the first gaskets 607 through the accommodating space 700.

Specific structures of the second gaskets 608 in this embodiment are the same as the structures of the first gaskets 607, and the specific structures of the second gaskets 608 are not described again in this embodiment.

Specifically, one first gasket 607 in this embodiment is disposed on an end face, facing the first cable access hole 501, of the first elastic member 605, and the other first gasket 607 is disposed on an end face, facing the first abutting member 603, of the first elastic member 605.

As shown in FIG. 17, the first gaskets 607 and the end faces of the first elastic member 605 form a detachable connection structure. That is, the first gasket 607 and the first elastic member 605 are two components independent from each other.

Further, as shown in FIG. 26, the first gaskets 607 are fixedly disposed on the end faces of the first elastic member 605. A manner of fixedly disposing the first gaskets 607 on the end faces of the first elastic member 605 is not limited in this embodiment. For example, the first gaskets 607 are adhered to the end faces of the first elastic member 605 by using an adhesive material.

Further, as shown in FIG. 27, the gasket sub-members 600 are fixedly disposed on the end faces of the first elastic member 605. A specific manner of fixedly disposing the gasket sub-members 600 on the end faces of the first elastic member 605 is the same as that a manner of fixedly disposing the first gaskets 607 on the end faces of the first elastic member 605, and details are not described again.

The first gaskets 607 are fixedly disposed on the end faces of the first elastic member 605, and therefore difficulty in installing the optical cable by a user is further reduced, an operation procedure is simplified, and efficiency of installing the optical cable is further improved.

Figure 18:
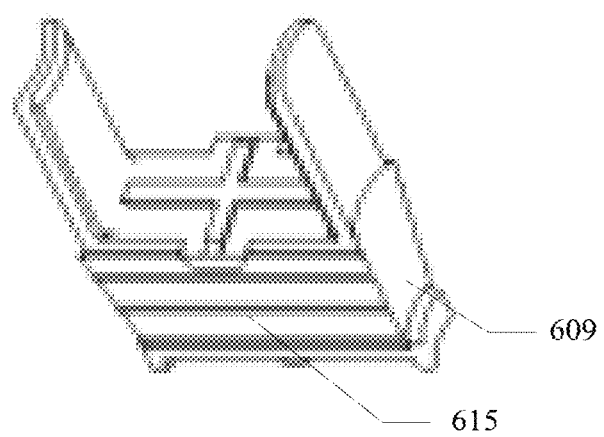
FIG. 18 is an overall schematic structural diagram of an embodiment of a wedge-shaped block according to the present invention.
Figure 19:
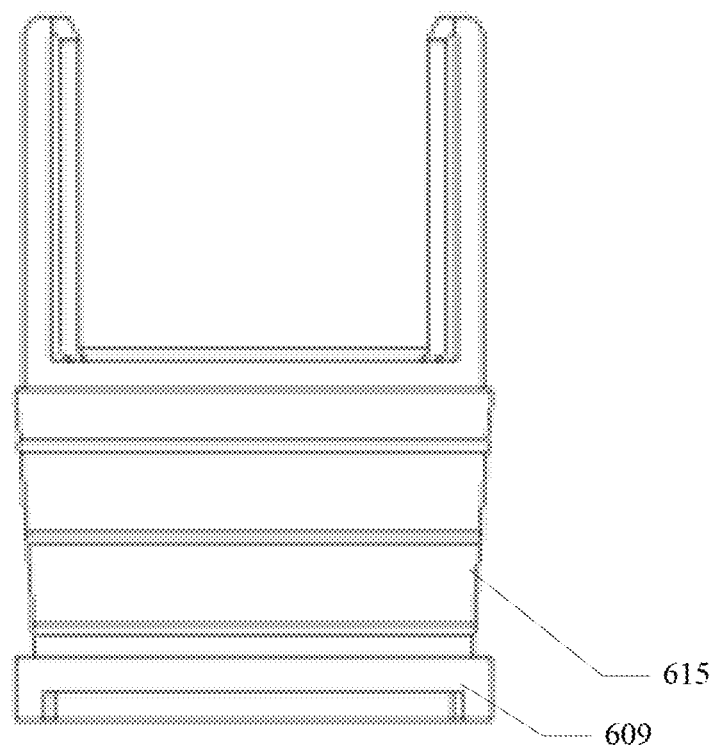
FIG. 19 is a schematic structural diagram of a side view of an embodiment of a wedge-shaped block according to the present invention.
Figure 20:
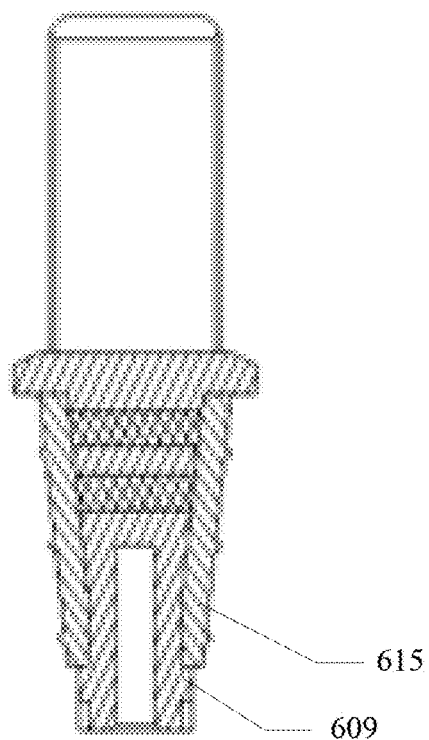
FIG. 20 is a schematic structural diagram of a side view of an embodiment of a wedge-shaped block according to the present invention.

A specific structure of the wedge-shaped block 609 is described below with reference to FIG. 18 to FIG. 20.

An elastic layer 615 is provided on an outer circumferential surface of a head of the wedge-shaped block 609.

A specific process of manufacturing the wedge-shaped block 609 is not limited in this embodiment, provided that the manufactured wedge-shaped block 609 can seal the first cable access hole 501. For example, a two-shot molding process may be used: first a rigid wedge-shaped block 609 is produced by using a mold, and then over this rigid wedge-shaped framework, a thermoplastic soft-plastic material such as a Thermoplastic Elastomer (TPE) is injected over the framework by using an injection molding machine, to form the complete elastic layer 615.

A manner of sealing a straight-through cable by using the splice closure provided in this embodiment is described below with reference to a specific sealing procedure.

Figure 21:
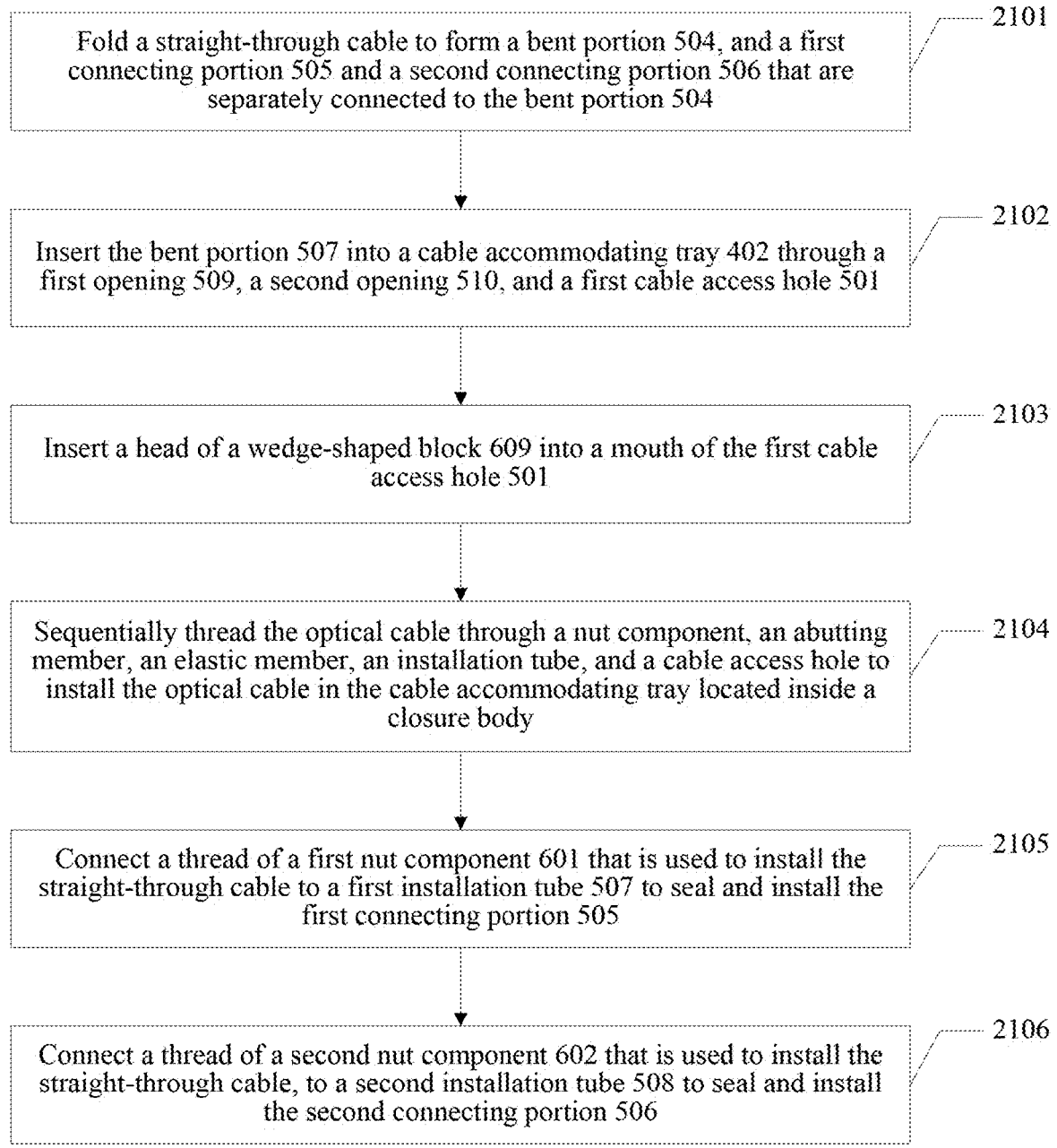
FIG. 21 is a flowchart of steps of an embodiment of a sealing method according to the present invention.

As shown in FIG. 21, a manner, provided in an embodiment, of sealing a straight-through cable by using the splice closure provided in the foregoing embodiment is described.

Step 2101. Fold the straight-through cable to form the bent portion 504, and the first connecting portion 505 and the second connecting portion 506 that are separately connected to the bent portion 504.

For a specific disposing manner, refer to FIG. 6, and details are not described herein again.

Step 2102. Insert the bent portion 504 into the cable accommodating tray 402 through the first opening 509, the second opening 510, and the first cable access hole 501.

By means of step 2102 in this embodiment, the first connecting portion 505 can be inserted into the first installation tube 507 through the first opening 509, and the second connecting portion 506 can be inserted into the second installation tube 508 through the second opening 510.

For the specific structures of the first opening 509, the second opening 510, the first cable access hole 501, and the cable accommodating tray 402, refer to the foregoing embodiment, and details are not described herein again.

Step 2103. Insert the head of the wedge-shaped block 609 into a mouth of the first cable access hole 501.

In this embodiment, when the bent portion 504 is inserted into the first cable access hole 501, the head of the wedge-shaped block 609 may be inserted into the mouth of the first cable access hole 501, so that the head of the wedge-shaped block 609 is located between the mouth of the first cable access hole 501 and the optical cable.

Step 2104. Sequentially thread the optical cable through a nut component, an abutting member, an elastic member, an installation tube, and a cable access hole to install the optical cable in the cable accommodating tray located inside the closure body.

During installation of the straight-through cable, specifically, the first gasket 607, the first elastic member 605, the first gasket 607, the first abutting member 603, and the first nut component 601 may be sequentially disposed around the first connecting portion 505 of the straight-through cable, and the second gasket 608, the second elastic member 606, the second gasket 608, the second abutting member 604, and the second nut component 602 may be sequentially disposed around the second connecting portion 506 of the straight-through cable.

For the specific structures of the foregoing components and the specific disposing process, refer to the foregoing embodiment, and details are not described herein again.

In this embodiment, the first gaskets 607 and the second gaskets 608 are optional components. An example in which the first connecting portion 505 is installed is used. The two first gaskets 607 are located at two ends of the first elastic member 605. By means of the first gaskets 607, optical fibers included in the first connecting portion 505 can be effectively gathered, so that the optical fibers can be desirably gathered inside the first elastic member 605 and the first abutting member 603 by using the first gaskets 607, thereby reducing a possibility of gaps among the optical fibers, and improving a sealing effect.

Specifically, the first gasket 607 located between the first abutting member 603 and the first elastic member 605 is used to evenly transmit an abutting force of the first abutting member 603 to the first elastic member 605, so that the abutting force of the first abutting member 603 can be evenly transmitted to the first elastic member 605, and therefore the first elastic member 605 can elastically deform uniformly, thereby preventing a sealing effect from being affected because the first elastic member 605 cannot elastically deform uniformly.

Optionally, the first elastic member 605 and the first gaskets 607 in this embodiment may be components independent from each other, or the first elastic member 605 and the first gaskets 607 may be fixedly connected. For details, refer to the foregoing embodiment, and the details are not described herein again.

Step 2105. Connect a thread of the first nut component 601 that is used to install the straight-through cable to the first installation tube 507 to seal and install the first connecting portion 505.

Specifically, a user may apply, to the first nut component 601, a force toward the closure body 401, so that the first nut component 601 that is disposed around the first connecting portion 505 can drive the first abutting member 603 to slide in a guiding direction of the first connecting portion 505 to approach the first installation tube 507.

Then, the user may apply a screwing force to the first nut component 601, so that the internally threaded section of the first nut component 601 is connected to the externally threaded section of the first installation tube 507, and therefore the first abutting member 603 abuts and squeezes the first elastic member 605 located in the first installation tube 507, to cause the first elastic member 605 to elastically deform. An inner diameter of the first elastic member 605 that elastically deforms decreases. The user continues screwing the first nut component 601, until an inner circumferential surface of the first elastic member 605 that elastically deforms abuts the first connecting portion 505, and an outer circumferential surface of the first elastic member 605 that elastically deforms abuts the elastic layer disposed on the outer circumferential surface of the head of the wedge-shaped block 609.

Step 2106. Connect a thread of the second nut component 602 that is used to install the straight-through cable to the second installation tube 508 to seal and install the second connecting portion 506.

Specifically, the user may apply, to the second nut component 602, a force toward the closure body 401, so that the second nut component 602 that is disposed around the second connecting portion 506 can drive the second abutting member 604 to slide in a guiding direction of the second connecting portion 506 to approach the second installation tube 508.

Then, the user may apply a screwing force to the second nut component 602, so that the internally threaded section of the second nut component 602 is connected to the externally threaded section of the second installation tube 508, and therefore the second abutting member 604 abuts and squeezes the second elastic member 606 located in the second installation tube 508, to cause the second elastic member 606 to elastically deform. An inner diameter of the second elastic member 606 that elastically deforms decreases. The user continues screwing the second nut component 602, until an inner circumferential surface of the second elastic member 606 that elastically deforms abuts the second connecting portion 506, and an outer circumferential surface of the second elastic member 606 that elastically deforms abuts the elastic layer disposed on the outer circumferential surface of the head of the wedge-shaped block 609.

With reference to the specific structure of the splice closure and the sealing method based on the splice closure in this embodiment, when the elastic layer disposed on the outer circumferential surface of the head of the wedge-shaped block 609 separately abuts the first elastic member 605 and the second elastic member 606, gaps between the straight-through cable and the first cable access hole 501 are sealed, and when the first elastic member 605 and the first connecting portion 505 abut against each other, and the second elastic member 606 and the second connecting portion 506 abut against each other, gaps between the straight-through cable and the elastic members are sealed.

A manner of sealing a branching cable by using the splice closure in this embodiment is described below.

Figure 22:
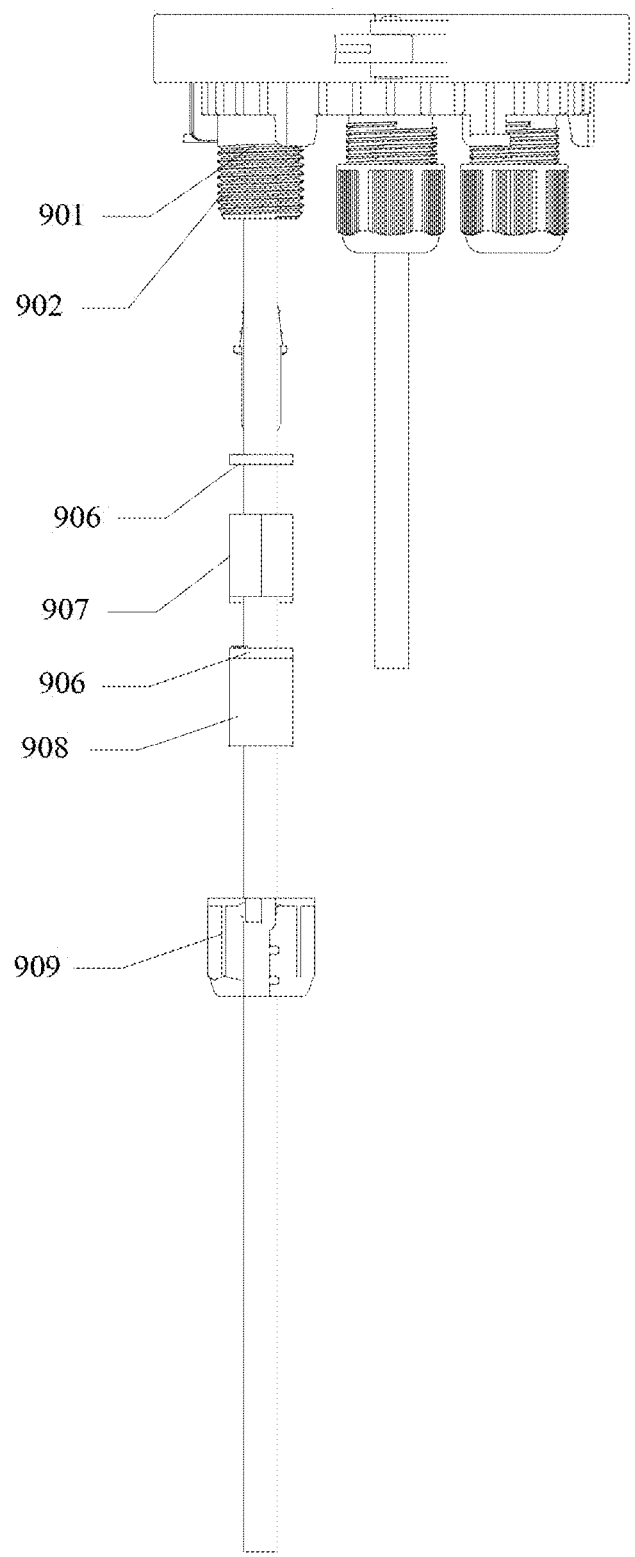
FIG. 22 is a schematic structural diagram of a cross section of another embodiment of a splice closure according to the present invention.
Figure 23:
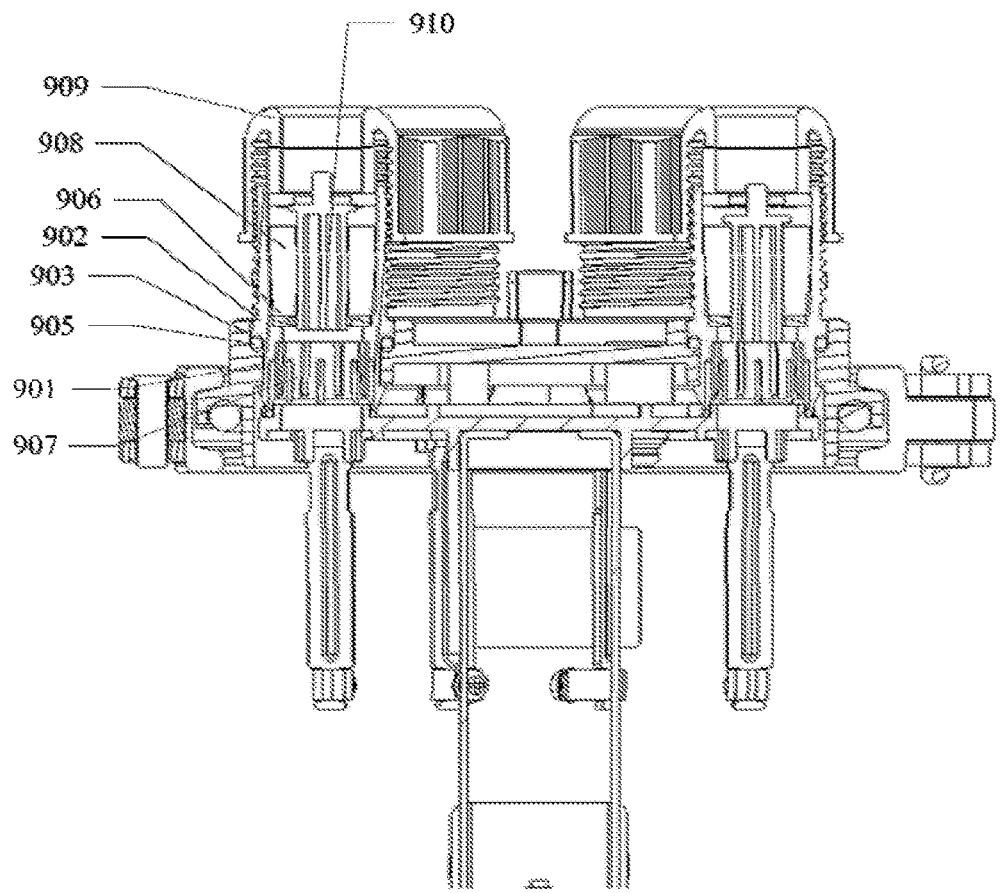
FIG. 23 is a partial schematic structural diagram of a cross section of another embodiment of a splice closure according to the present invention.

First, referring to FIG. 22 and FIG. 23, FIG. 22 is a schematic structural diagram of a cross section of another embodiment of a splice closure according to the present invention, and FIG. 23 is a partial schematic structural diagram of a cross section of another embodiment of a splice closure according to the present invention.

First referring to FIG. 6, at least one second cable access hole 901 is provided on an end face of the closure body 401.

The second cable access hole 901 in this embodiment is in a circular structure.

The splice closure in this embodiment further includes at least one third installation tube 902 that is used to install the branching cable.

A quantity of the third installation tubes 902 is the same as a quantity of the second cable access holes 901 in this embodiment, and the third installation tube 902 and the second cable access hole 901 are correspondingly disposed.

Figure 24:
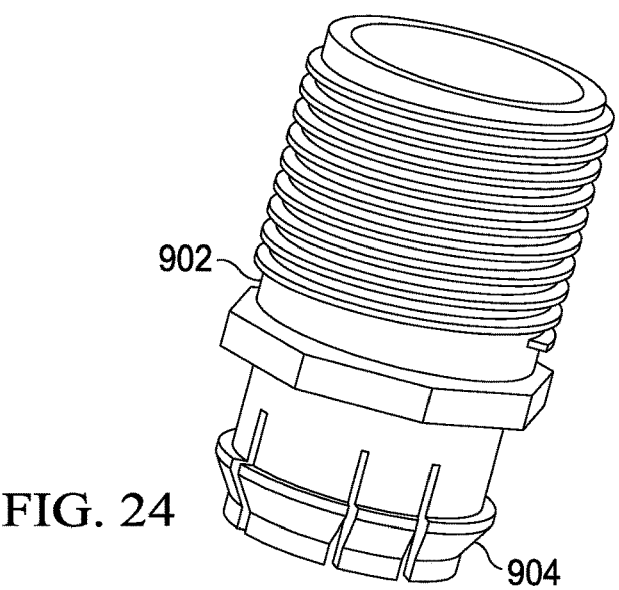
FIG. 24 is an overall schematic structural diagram of an embodiment of a third installation tube included in a splice closure according to the present invention.

Specifically, a specific structure of one third installation tube 902 may be shown in FIG. 24.

It can be learned that the third installation tube 902 in this embodiment is in a cylindrical structure, and an externally threaded section is annularly provided on an outer circumferential surface of the third installation tube 902.

A manner of connecting the third installation tube 902 and the second cable access hole 901 is described below.

Specifically, an abutting portion 903 is provided on an inner circumferential wall of a mouth of the second cable access hole 901, and an elastic fastener 904 is provided on an outer circumferential wall of the third installation tube 902. During installation, the third installation tube 902 may be inserted into the second cable access hole 901, so that the elastic fastener 904 of the third installation tube 902 is fastened to the abutting portion 903, and then the third installation tube 902 is installed on the second cable access hole 901.

It should be noted that, in this embodiment, the manner of installing the third installation tube 902 and the second cable access hole 901 is described as an example, and is not limited. For example, matching structures such as threads may alternatively be correspondingly provided on the third installation tube 902 and the second cable access hole 901.

Optionally, to improve sealing performance of the branching cable by using the splice closure, a sealing ring 905 is further provided between the third installation tube 902 and the second cable access hole 901.

Sealing performance between the third installation tube 902 and the second cable access hole 901 is improved by using the sealing ring 905.

To seal the branching cable, a third gasket 906, a third elastic member 907, a third gasket 906, a third abutting member 908, and a third nut component 909 are sequentially disposed around the branching cable.

For specific structures of the third gaskets 906 in this embodiment and a method for disposing the third gaskets 906 around the optical cable, refer to the first gaskets 607 in the foregoing embodiment, and details are not described again in this embodiment.

For a specific structure of the third elastic member 907 in this embodiment and a method for disposing the third elastic member 907 around the optical cable, refer to the first elastic member 605 in the foregoing embodiment, and details are not described again in this embodiment.

For a specific structure of the third abutting member 908 in this embodiment and a method for disposing the third abutting member 908 around the optical cable, refer to the first abutting member 603 in the foregoing embodiment, and details are not described again in this embodiment.

For a specific structure of the third nut component 909 in this embodiment and a method for disposing the third nut component 909 around the optical cable, refer to the first nut component 601 in the foregoing embodiment, and details are not described again in this embodiment.

Optionally, as shown in FIG. 23, the splice closure in this embodiment further includes a cable seal 910. Specifically, when a branching cable is not installed in the splice closure, the third gasket 906, the third elastic member 907, the third gasket 906, the third abutting member 908, and the third nut component 909 may be sequentially disposed around the cable seal 910. During installation of the branching cable, the cable seal 910 may be detached from the splice closure, and then the branching cable may be inserted into the splice closure.

A manner of sealing the branching cable by using the splice closure provided in this embodiment is described below with reference to a specific sealing procedure.

Figure 25:
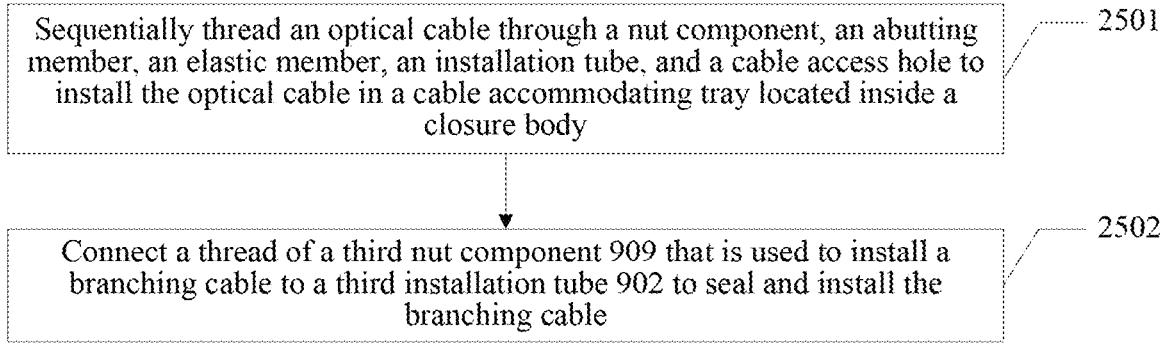
FIG. 25 is a flowchart of steps of another embodiment of a sealing method according to the present invention.

As shown in FIG. 25, a manner, provided in an embodiment, of sealing a branching cable by using the splice closure provided in this embodiment is described.

Step 2501. Sequentially thread an optical cable through a nut component, an abutting member, an elastic member, an installation tube, and a cable access hole to install the optical cable in the cable accommodating tray located inside the closure body.

During installation of the branching cable, specifically, the third gasket 906, the third elastic member 907, the third gasket 906, the third abutting member 908, and the third nut component 909 may be disposed around the branching cable.

For the specific structures of the foregoing components and the specific disposing process, refer to the foregoing embodiment, and details are not described herein again.

In this embodiment, the third gaskets 906 are optional components, and the two third gaskets 906 are located at two ends of the third elastic member 907. By means of the third gaskets 906, optical fibers included in the branching cable can be effectively gathered, so that the optical fibers can be desirably gathered inside the third elastic member 907 and the third abutting member 908 by using the third gaskets 906, thereby reducing a possibility of gaps among the optical fibers, and improving a sealing effect.

Specifically, the third gasket 906 located between the third abutting member 908 and the third elastic member 907 is used to evenly transmit an abutting force of the third abutting member 908 to the third elastic member 907, so that the abutting force of the third abutting member 908 can be evenly transmitted to the third elastic member 907, and therefore the third elastic member 907 can elastically deform uniformly, thereby preventing a sealing effect from being affected because the third elastic member 907 cannot elastically deform uniformly.

Step 2502. Connect a thread of the third nut component 909 that is used to install the branching cable to a third installation tube 902 to seal and install the branching cable.

Specifically, a user may apply, to the third nut component 909, a force toward the closure body 401, so that the third nut component 909 that is disposed around the branching cable can drive the third abutting member 908 to slide in a guiding direction of the branching cable to approach the third installation tube 902.

Then, the user may apply a screwing force to the third nut component 909, so that the internally threaded section of the third nut component 909 is connected to the externally threaded section of the third installation tube 902, and therefore the third abutting member 908 abuts and squeezes the third elastic member 907 located in the third installation tube 902, to cause the third elastic member 907 to elastically deform. An inner diameter of the third elastic member 907 that elastically deforms decreases. The user continues screwing the third nut component 909, until an inner circumferential surface of the third elastic member 907 that elastically deforms abuts the branching cable, and an outer circumferential surface of the third elastic member 907 that elastically deforms abuts the third installation tube 902.

Beneficial effects of using the splice closure and the sealing method in the embodiments are as follows.

Even when the splice closure in the embodiments is applied to a harsh environment such as an underground environment, a protection level of IP68 can be reached. The splice closure that reaches the protection level of IP68 can work for two weeks at 10 meters underwater without water entry, and the product can maintain desirable performance after 12 hours of destructive testing at 100 meters underwater.

In a process of sealing the optical cable by using the splice closure in the embodiments, a power supply and another device (for example, a heat gun in the current technology) are not needed, and the optical cable is sealed only mechanically. That is, after components are disposed around the optical cable, and the nut component is tightly screwed on the installation tube, the optical cable can be sealed. A sealing process is simple, operations are rapid, and efficiency of sealing the optical cable is effectively improved.

In a subsequent process of maintaining the splice closure, the optical cable does not need to be cut, and the nut component only needs to be screwed off the installation tube to maintain the splice closure. It can be learned that, by using the splice closure in the embodiments, an optical cable is repeatedly installed, an operation procedure of maintenance is simplified, maintenance costs are reduced, and maintenance efficiency is improved.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A splice closure, comprising:
   a closure body;
   a cable accommodating tray disposed inside the closure body, wherein an end face of the closure body comprises a first cable access hole, a first installation tube is connected to the first cable access hole, an outer surface of the first installation tube comprises an annular externally threaded section, and the first installation tube has a first opening;
   a first nut component, wherein an inner surface of the first nut component comprises an annular internally threaded section;
   a first abutting member, wherein the first abutting member is hollow, and the first abutting member is disposed in the first nut component;
   a first elastic member and a second elastic member, wherein the first elastic member and the second elastic member are hollow, and the first elastic member is disposed in the first installation tube and the second elastic member is disposed in a second installation tube, and the second installation tube has a second opening; and
   at least two gaskets;
   wherein when an optical cable is threaded through the first nut component, the first installation tube, and the first cable access hole and installed in the cable accommodating tray, the first abutting member is located between the optical cable and the first nut component, and the first elastic member is located between the optical cable and the first installation tube;
   wherein when the first nut component is screwed to the externally threaded section of the first installation tube using threads of the internally threaded section, the first abutting member abuts the first elastic member, the first elastic member elastically deforms under an abutting effect of the first abutting member, an inner wall of the first elastic member elastically deforms to abut the optical cable, and an outer wall of the first elastic member elastically deforms to abut an inner wall of the first installation tube;

wherein the splice closure further comprises a wedge-shaped block, and an elastic layer on an outer surface of a head of the wedge-shaped block;

wherein the head of the wedge-shaped block is disposed in a mouth of the first cable access hole, and the head of the wedge-shaped block abuts between the first elastic member and the second elastic member;

wherein the first elastic member and the elastic layer abut against each other through the first opening, and the second elastic member and the elastic layer abut against each other through the second opening;

wherein a first gasket of the at least two gaskets is disposed on a target end face of the first elastic member, and the target end face of the first elastic member is an end face, facing the first cable access hole, of the first elastic member, or an end face, facing the first abutting member, of the first elastic member;

wherein the first gasket abuts the target end face of the first elastic member, or the first gasket is fixedly disposed on the target end face of the first elastic member;

wherein the end face of the closure body further comprises a second cable access hole, and the splice closure further comprises a third installation tube, wherein the second cable access hole and the third installation tube are configured to be used to install a branching cable; and wherein an inner wall of a mouth of the second cable access hole comprises a second abutting portion, and an elastic fastener is disposed on an outer wall of the third installation tube, and when the elastic fastener is fastened to the second abutting portion, the third installation tube is fixedly disposed on the second cable access hole.

2. The splice closure according to claim 1, wherein an end face of the first nut component comprises a hollow structure, and the end face of the first nut component extends toward an axis of the first nut component to form a holding portion, wherein the end face of the first nut component is disposed away from the closure body, and wherein the holding portion is configured to abut the first abutting member disposed in the first nut component; and wherein the first abutting member comprises at least two sub-members, wherein the at least two sub-members are joined to form the first abutting member, one end of one of the at least two sub-members abuts the holding portion, and another end of the one of the at least two sub-members abuts the first elastic member.

3. The splice closure according to claim 2, wherein a side of the first elastic member comprises a slot longitudinally extending along the first elastic member, and the first elastic member is configured to accommodate an insertion of the optical cable through the slot.

4. The splice closure according to claim 1, wherein a side of the first elastic member comprises a slot longitudinally extending along the first elastic member, and the first elastic member is configured to accommodate an insertion of the optical cable through the slot.

5. The splice closure according to claim 1, wherein the first nut component comprises a first sub-nut and a second sub-nut, the first sub-nut is joined to the second sub-nut, and an inner surface of the first sub-nut and an inner surface of the second sub-nut comprise internally threaded sections.

6. The splice closure according to claim 5, wherein:
the first sub-nut comprises grooves located at target positions of the first sub-nut, the target positions of the first sub-nut are end faces, facing the second sub-nut, of the first sub-nut, and the target positions of the first sub-nut are located at two ends of the internally threaded section of the inner surface of the first sub-nut;

guides are disposed at target positions of the second sub-nut, wherein the target positions of the second sub-nut are end faces, facing the first sub-nut, of the second sub-nut, the target positions of the second sub-nut are located at two ends of the internally threaded section of the inner surface of the second sub-nut; and wherein the guides of the second sub-nut are configured in a manner that when the guides of the second sub-nut are inserted into the grooves of the first sub-nut, the guides of the second sub-nut relatively slide in guiding directions of the grooves of the first sub-nut, until ends of the guides of the second sub-nut slide to bottoms of the grooves along the grooves of the first sub-nut, and the first sub-nut and the second sub-nut are joined to form the first nut component.

7. The splice closure according to claim 6, wherein at least one first through hole extends through an end of the first sub-nut, at least one second through hole extends through an end of the second sub-nut, any one of the at least one first through hole is a target first through hole, and a second through hole of the at least one second through hole that is disposed coaxially with the target first through hole is a target second through hole; and wherein an inner surface of the target first through hole comprises an internally threaded section, wherein a screw sequentially passes through the target second through hole and the target first through hole, the screw comprises an externally threaded section, and the externally threaded section of the screw is connected to the internally threaded section of the inner surface of the target first through hole.

8. The splice closure according to claim 5, wherein at least one first through hole is extends through an end of the first sub-nut, at least one second through hole extends through an end of the second sub-nut, any one of the at least one first through hole is a target first through hole, and a second through hole of the at least one second through hole that is disposed coaxially with the target first through hole is a target second through hole; and wherein an inner surface of the target second through hole comprises an internally threaded section, a screw sequentially passes through the target first through hole and the target second through hole, the screw comprises an externally threaded section, and the externally threaded section of the screw is connected to the internally threaded section of the target second through hole.

9. The splice closure according to claim 1, wherein:
the first cable access hole, the first installation tube, and the second installation tube are configured to be used to install a straight-through cable;

the first cable access hole is comprised in an elliptical structure, the first installation tube and the second installation tube are respectively disposed at two ends of a major axis of the first cable access hole, the first installation tube comprises the first opening in an axial direction of the first installation tube, the second installation tube comprises the second opening in an axial direction of the second installation tube, and the first opening and the second opening are disposed opposite each other in a direction of the major axis of the first cable access hole; and the straight-through cable is folded, forming a bent portion, and a first connecting portion and a second connecting portion that are separately connected to the bent portion, wherein the bent portion is disposed in the cable accommodating tray, the first connecting portion extends into the first installation tube through the first opening, and the second connecting portion extends into the second installation tube through the second opening.

10. The splice closure according to claim 9, further comprising:
a second nut component; and
wherein the first nut component and the second nut component are configured to be used to install the straight-through cable, a thread of the first nut component is connected to the first installation tube to seal and install the first connecting portion, and a thread of the second nut component is connected to the second installation tube to seal and install the second connecting portion.

* * * * *